US010747390B1

(12) United States Patent
Ranabahu et al.

(10) Patent No.: US 10,747,390 B1
(45) Date of Patent: Aug. 18, 2020

(54) GRAPHICAL COMPOSER FOR POLICY MANAGEMENT

(71) Applicant: Amazon Technologies, Inc., Reno, NV (US)

(72) Inventors: Ajith Harshana Ranabahu, Shoreline, WA (US); Khaled Salah Sedky, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 14/228,148

(22) Filed: Mar. 27, 2014

(51) Int. Cl.
*G06F 3/0481* (2013.01)
*G06F 3/0484* (2013.01)
*G06F 21/62* (2013.01)

(52) U.S. Cl.
CPC ...... *G06F 3/04817* (2013.01); *G06F 3/04842* (2013.01); *G06F 21/62* (2013.01)

(58) Field of Classification Search
CPC ............. H04L 41/0893; G06F 3/04842; G06F 3/04817
USPC ............................................. 715/771; 15/771
See application file for complete search history.

(56) References Cited

U.S. PATENT DOCUMENTS

| | | | |
|---|---|---|---|
| 5,821,934 A | 10/1998 | Kodosky et al. | |
| 6,986,148 B2 | 1/2006 | Johnson et al. | |
| 7,117,504 B2* | 10/2006 | Smith | G06F 8/20 709/201 |
| 7,496,832 B2* | 2/2009 | Chen | G06F 17/243 715/221 |
| 7,647,578 B2 | 1/2010 | Murphy et al. | |
| 8,181,150 B2 | 5/2012 | Szpak et al. | |
| 8,701,080 B2* | 4/2014 | Tripathi | G06F 8/36 715/763 |
| 8,751,199 B1 | 6/2014 | Behdoodian | |
| 9,094,292 B2 | 7/2015 | Tung et al. | |
| 2004/0006744 A1* | 1/2004 | Jones | G06F 17/2229 715/237 |

(Continued)

OTHER PUBLICATIONS

Alparslan, Denizhan, Simulink Design Verifier 2.0—Product Presentation, The MathWorks, Inc. (2011).*

(Continued)

*Primary Examiner* — Sherief Badawi
*Assistant Examiner* — Conrad R Pack
(74) *Attorney, Agent, or Firm* — David Wright Tremaine LLP

(57) ABSTRACT

A customer of a policy management service may use an interface to access a graphical composer and generate one or more graphical representations of policies that may be applicable to the customer's one or more resources. Once the customer has created a graphical representation of a policy, the policy management service may generate a permission model based at least on the graphical representation of the policy to perform one or more simulations and determine whether the requested policy includes any errors or conflicts. If the one or more simulations result in the requested policy including no errors or conflicts, the policy management service may serialize the permission model to create a representation of the policy in a policy language. This representation of the policy may then be used to control access to the customer's one or more resources in accordance with the policy.

21 Claims, 14 Drawing Sheets

(56) References Cited

U.S. PATENT DOCUMENTS

| | | | | |
|---|---|---|---|---|
| 2004/0039803 A1* | 2/2004 | Law | ................... | H04L 41/0893 709/223 |
| 2005/0198247 A1 | 9/2005 | Perry et al. | | |
| 2005/0273773 A1* | 12/2005 | Gold | ......................... | G06F 8/34 717/139 |
| 2006/0005227 A1* | 1/2006 | Samuelsson | ........ | G06F 21/6218 726/1 |
| 2006/0074730 A1* | 4/2006 | Shukla | .................... | G06Q 10/06 705/7.27 |
| 2007/0222783 A1* | 9/2007 | Seemann | ................. | G06F 9/451 345/441 |
| 2007/0250699 A1* | 10/2007 | Dube | ..................... | G06Q 10/10 713/150 |
| 2008/0134286 A1* | 6/2008 | Amdur | .................. | G06F 21/604 726/1 |
| 2008/0209506 A1* | 8/2008 | Ghai | ....................... | G06F 21/55 726/1 |
| 2009/0222884 A1* | 9/2009 | Shaji | ..................... | H04L 41/082 726/1 |
| 2010/0011311 A1 | 1/2010 | Kodosky et al. | | |
| 2010/0042670 A1 | 2/2010 | Kamalakantha et al. | | |
| 2010/0042868 A1* | 2/2010 | Apelbaum | .......... | G06F 11/1482 714/2 |
| 2010/0083222 A1 | 4/2010 | Maximilien et al. | | |
| 2011/0055707 A1 | 3/2011 | Kimmet | | |
| 2011/0099603 A1* | 4/2011 | K. | ......................... | G06F 21/604 726/1 |

OTHER PUBLICATIONS

Nguyen et al., A Provenance-based Access Control Model for Dynamic Separation of Duties, 2013 Eleventh Annual Conference on Privacy, Security and Trust (PST), pp. 247-256, available at https://www.profsandhu.com/cs6393_s16/nguyen-et-al-2013.pdf (2013).*

Rabitti et al., A Model of Authorization for Next-Generation Database Systems, ACM Transactions on Database Systems, vol. 16, No. 1, pp. 88-131 (1991).*

Al et al., "iArch—An IDE for Supporting Abstraction-aware Design Traceability," Modelsward, Published Jan. 7, 2014, retrieved on Apr. 22, 2016, from http://ieeexplore.ieee.org/xpls/abs_all.jsp?arnumber=7018494, 7 pages.

AWS, "Amazon Cloud Formation User Guide," dated May 15, 2010, retrieved on Apr. 3, 2016, from http://docs.aws.amazon.com/AWSCloudFormation/latest/UserGuide/cfn-ug.pdf, 956 pages.

Davis, Platform as a Service (PaaS) with VMware Wavemaker, virtualizationadmin.com, Published Dec. 4, 2012, retrieved on Apr. 3, 2016, from http://www.virtualizationadmin.com/articles-tutorials/cloud-computing/general/platform-as-a-service-paas-vmware-wavemaker.html, 4 pages.

* cited by examiner

GRAPHICAL COMPOSER FOR POLICY MANAGEMENT

CROSS-REFERENCE TO RELATED APPLICATIONS

This application incorporates by reference for all purposes the full disclosure of co-pending U.S. patent application Ser. No. 14/228,131, filed concurrently herewith, entitled "GRAPHICAL COMPOSER FOR SERVICE INTEGRATION."

BACKGROUND

Computing resource service providers and other service providers often grant users access to one or more services to create and manage a variety of resources necessary to support the users' business needs. For instance, a customer may want to grant other users access to his/her resources, through the one or more services, in order to perform one or more actions on behalf of the customer while ensuring the security of his/her resources. In another instance, a customer may want to utilize multiple resources across the one or more services to develop and utilize software applications for use by his/her customers. Generally, the management and integration of such resources across multiple services can present some challenges. For instance, defining policies to ensure the security of the customer's provisioned resources can be difficult to visualize. Further, significant knowledge may be required to integrate the customer's resources across the one or more services. Developing such an understanding of resource integration and management may thus require certain expertise, which a customer may not have.

BRIEF DESCRIPTION OF THE DRAWINGS

Various embodiments in accordance with the present disclosure will be described with reference to the drawings, in which.

DETAILED DESCRIPTION

Figure 1:
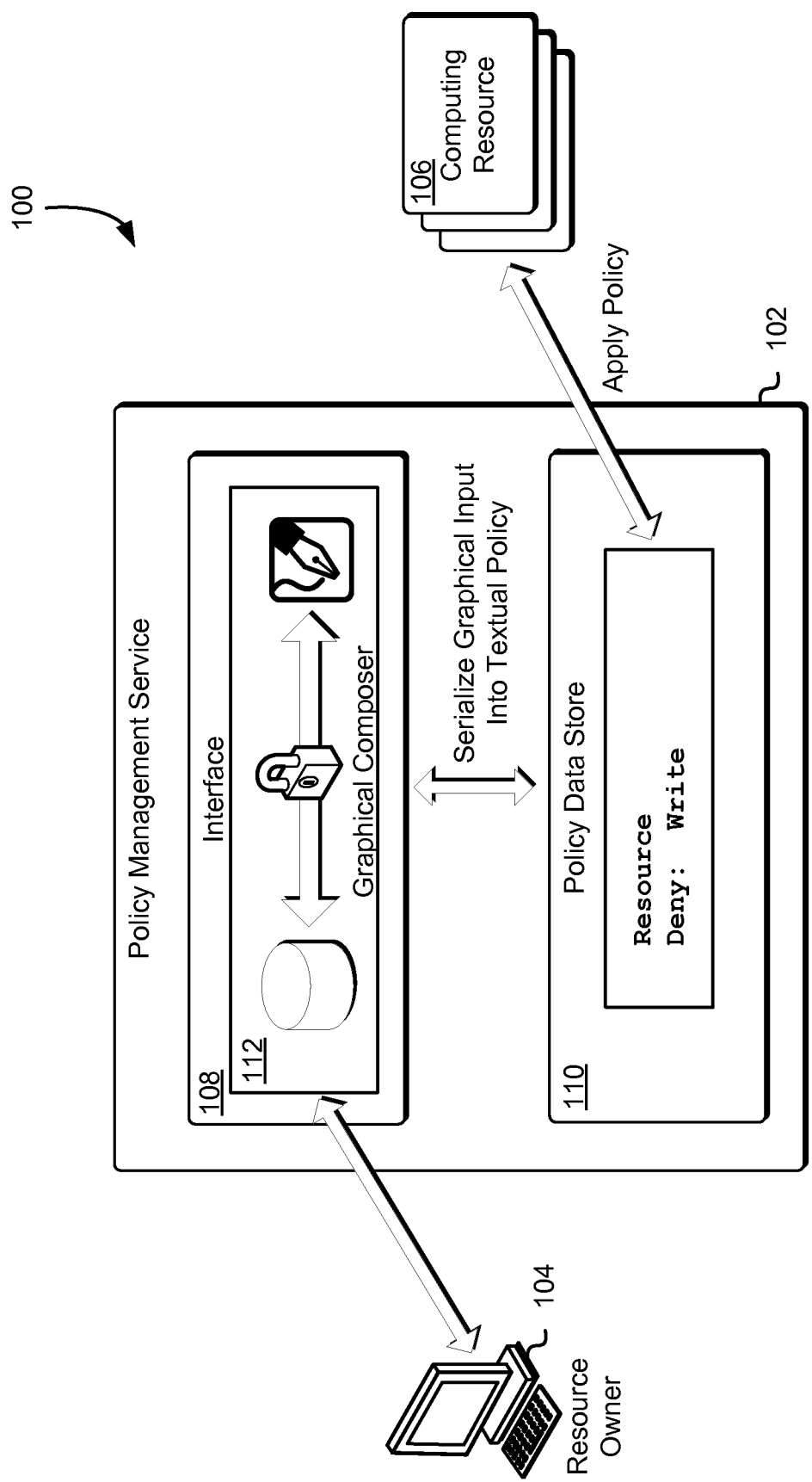
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of graphical composers to manage and integrate resources across a plurality of services provided by a computing resource service provider. In an embodiment, an entity (e.g., an organization) communicates with a policy management service, such as through one or more application programming interface (API) calls to the policy management service, to request creation of a policy that may, for example, be utilized to establish, for one or more users, a level of access to one or more resources provisioned by the entity. The entity may be a customer of a computing resource service provider that may utilize one or more services such as a virtual computer system service, object-based data storage services, database services, the aforementioned policy management service and a plurality of other services to create and manage his or her resources and to support his or her business needs.

In various embodiments, the entity utilizes an interface, provided by the policy management service, to define one or more policies which may be used to establish the level of access to his or her resources. The interface may include a graphical composer, which the entity may utilize to create a graphical representation of a policy which is to be applied to one or more resources provisioned by the entity. For instance, the graphical composer may include one or more iconic representations of the entity's provisioned one or more resources, the one or more actions that may performed by a user of the one or more resources and the permissibility of these one or more actions. For example, the entity may utilize the graphical composer to select an iconic representation of a resource, select an iconic representation of an action (e.g., read, write, etc.) and connect these iconic representations with an allow or deny connector to define the policy. The graphical composer may be configured to provide certain efficiencies, such as defining policies for a plurality of users of the entity's provisioned resources without having to define a policy for each individual user and defining policies for a plurality of resources at once without having to define a policy for each individual resource.

In an embodiment, when the entity utilizes the graphical composer to generate a policy, the policy management service will construct a permission model based at least in part on the graphical representation of the policy generated by the entity. A permission model may be a textual representation of the policy that may be used to specify one or more permissions for users and/or system processes that utilize one or more computing resources. Accordingly, the policy management service may perform one or more simulations of the permission model to determine if any errors may occur if the policy is implemented. For instance, if an entity creates a graphical representation of a policy with conflicting permissions (e.g., a user of a resource is simultaneously allowed and denied permission to write to the resource, etc.), a simulation of the permission model may result in discovery of this conflict. If an error is detected, the policy management service may transmit a notification of the error or other information to the graphical composer, which may cause the graphical composer to notify the entity of the error, such as through highlighting the location of the error on the graphical representation of the policy, and enable the entity to rectify the error.

In an embodiment, once the entity has completed utilizing the graphical composer to define a policy applicable to one or more users of at least a resource provisioned by the entity, the policy management service will serialize the permission model to a structured format (e.g., JavaScript Object Notation (JSON), Extensible Markup Language (XML), SecPol, Amazon Web Services Access Policy Language, or any other suitable policy language and/or structured markup language) to create the policy. Accordingly, the policy management service may apply the created policy to the applicable resources provisioned by the entity, the one or more users affected by the policy and the one or more services where the one or more resources may be located. Further, the policy management service may enable the entity to utilize the interface to access these created policies and, if so desired, view a graphical representation of these policies through use of the graphical composer.

In an embodiment, the entity can also communicate with the computing resource service provider, such as through one or more API calls to the computing resource service provider, to request creation of an application (e.g., a configured collection of one or more resources configured to perform one or more operations for a particular purpose) that may, for example, be used by one or more users to perform one or more operations. In order to create the application and enable the one or more users to perform these operations, one or more resources, which may be provisioned by the entity through various services maintained by the computing resource service provider, may need to be integrated. Further, the entity may be required to provision additional resources to support the application that is to be created.

In various embodiments, the entity utilizes an interface, provided by the computing resource service provider, to create the application. The interface may include a graphical composer, which the entity may utilize to create a graphical representation of the interconnectivity and operations of resources that define the application to be created, as well as a graphical representation of the one or more elements that may be interconnected to provide users with an interface to access these resources. For instance, the graphical composer may include one or more iconic representations of different types of resources and actions that may be performed by these resources or the associated services. For example, the entity may utilize the graphical composer to select an iconic representation of a resource, select an iconic representation of an action and connect these iconic representations with another resource to illustrate an operation to be performed by the application.

In an embodiment, once the entity has created a graphical representation of the interconnectivity and operations of resources that define the application, the entity can access a second graphical composer to define one or more elements of the application that may be used to enable a user of the application to interact with these resources. For instance, this graphical composer may include one or more iconic representations of different types of elements and actions that may be used to define the appearance and elements of the application that a user may utilize to access one or more resources. For example, the entity may utilize this graphical composer to select an iconic representation of an element, select an iconic representation of an action and connect these iconic representations to an application layout to illustrate how the application may appear to a user when created.

In an embodiment, when the entity utilizes the graphical composer to generate an application, the computing resource service provider will construct a model of the application. Accordingly, the computing resource service provider may perform one or more simulations of this model to determine whether use of the application may result in one or more errors. If any errors are detected through simulation of the model, the computing resource service provider may transmit a notification of the errors to the graphical composer that may cause the graphical composer to display the cause of the error and enable the entity to correct the error prior to completing creation of the application. Further, the computing resource service provider may determine whether the entity, based on the model, may need to provision additional resources to support the application. For instance, if the entity has specified, through the graphical composer, that a managed queuing service is to utilize a particular queue to transmit one or more notifications to a logical data container, the computing resource service provider may determine whether the entity has provisioned a queue from the managed queuing service, the one or more notifications that are included in the queue and the target logical data container. If the entity does not own any of the resources, the computing resource service provider may cause the graphical composer to prompt the entity to determine whether he or she would like to provision the required resources to support the application.

In an embodiment, the computing resource service provider will utilize a compiler and a code generation mechanism to instantiate the model. This may include converting a domain specific language (DSL) representation of the one or more operations into executable code in an executable language. Accordingly, this executable code may be incorporated into a finalized application, which the entity may provide to its customers to support his or her business needs. Thus, when the application is executed by one of these customers, executable code may cause the various resources provisioned by the entity and the associated services maintained by the computing resource service provider to operate together to perform the customer's desired one or more operations.

In this manner, an entity may be able to utilize one or more graphical composers to integrate and define a level of access for his or her provisioned resources to support his or her business needs. In addition, the techniques described and suggested herein facilitate additional technical advantages. For example, because both graphical composers require the use of iconic representations of resources, the computing resource service provider may configure the interfaces to enable an entity to toggle between the graphical composers to define policies for the resources that are to be utilized within an application. This, in turn, may obviate the need for the entity to terminate the graphical composer used to create an application to access the policy management service and use the other graphical composer to define one or more policies for these resources. Thus, an entity may be able to quickly visualize the executable operations to be performed by the application and the relevant policies that have been implemented to ensure the security of the entity's resources.

FIG. 1 shows an illustrative example of an environment in which various embodiments can be implemented. In the environment 100, a policy management service 102 may provide a policy management system that is configured to enable customers to define a level of access and the ability to perform a set of actions to users of computing resources 106 provisioned by the customers. For example, customers and administrators of resources may request creation of a policy that includes one or more actions that may be performed by one or more delegated users of the computing resource 106 in order to support the business needs of the customers, the administrators of the resource and/or the individual users themselves. The policy management service 102 may comprise one or more components which may collectively be configured to enable resource owners to generate and manage policies and to further make these policies available to the various target computing resources 106 and their users.

As noted above, the policy management service 102 may be configured to enable customers and administrators of computing resources 106 to request creation of one or more policies. Accordingly, the environment 100 includes a customer 104. The customer 104 may be an individual or organization that may utilize the policy management service 102 to request creation of one or more policies for defining one or more actions that may be performed by a user on a particular computing resource 106 in order to support the business needs of the individual/organization and/or the user. Each customer 104 may utilize a policy management service interface 108 to create a policy comprising a listing of users that may utilize one or more target computing resources 106 provisioned and/or managed by the customer 104 and a listing of actions that may be performed by each of these users on the one or more target computing resources 106.

In an embodiment, the policy management service 102 provides for display the policy management service interface 108 to the customer 104. The policy management service 102 may provide the policy management service interface 108 for display such as by transmitting information to be displayed over a network, providing signals to a graphics card located on a customer's 104 computing device and the like. In an embodiment, the policy management service interface 108 includes a graphical composer 112, which the customer 104 can use to create a graphical representation of a policy. The graphical composer 112 may be configured to include one or more iconic representations of the computing resources 106 provisioned by the customer 104, as well as iconic representations of one or more actions that may be performed by a user on a resource and one or more connectors, which may be used to define whether a particular user is permitted or not permitted to perform a particular action on a target resource. Accordingly, the customer 104 may utilize the policy management service interface 108 to select one or more user profiles and access the graphical composer 112 to create a graphical representation of a policy that is to be applied for the selected one or more user profiles.

Once the customer 104 has used the graphical composer 112 to create a graphical representation of a policy, the policy management service 102 may generate a permissions model based at least in part on the graphical representation of the policy to perform one or more simulations. These simulations may be used to determine whether the policy defined by the customer 104 suffer from any errors and/or conflicts. For instance, an error or conflict may exist if a customer 104 defines a policy that both allows and denies a particular user from performing write operations on the same resource. Accordingly, if any errors and/or conflicts are discovered, the policy management service 102 may transmit one or more notifications to the graphical composer 112 to cause the graphical composer 112 to display one or more messages that include the nature of the errors/conflicts and highlight portions of the graphical representation of the policy where the errors/conflicts exist. For example, if an error and/or conflict is found, the graphical composer 112 may change the color of any connectors to illustrate that this is where the error and/or conflict exists. Accordingly, the customer 104 may proceed to modify the graphical representation of the policy to address these issues.

If the simulation of the graphical representation of the policy results in no errors or conflicts, the policy management service 102 may serialize the permission model into a structured format (e.g., JSON, XML, SecPol, Amazon Web Services Access Policy Language etc.) to create the policy. Subsequently, the policy management service 102 may redundantly store this newly created policy in a policy data store 110. The policy data store 110 may comprise various computing hardware resources for storing and making available these policies to the various target computing resources 106 and their users. Thus, once a policy has been created and stored within the policy data store 110, the policy management service 102 may apply the newly created policy to the one or more computing resources 106 based at least in part on the resources specified within the policy.

The customer 104 may further interact with the policy management service interface 108 to access one or more policies that may be stored within the policy data store 110. Accordingly, the policy management service 102 may utilize the stored policy to generate a graphical representation of the stored policy and provide this graphical representation to the customer 104 through the graphical composer 112. This may enable the customer 104 to visualize the policy and understand its effects on the target computing resources 106 and the users of these target computing resources 106. Additionally, this may enable the customer 104 to utilize the graphical composer 112 to modify any existing policies as needed (e.g., create new policies based at least in part on an existing policy, modify an existing policy to address certain issues, etc.).

Figure 2:
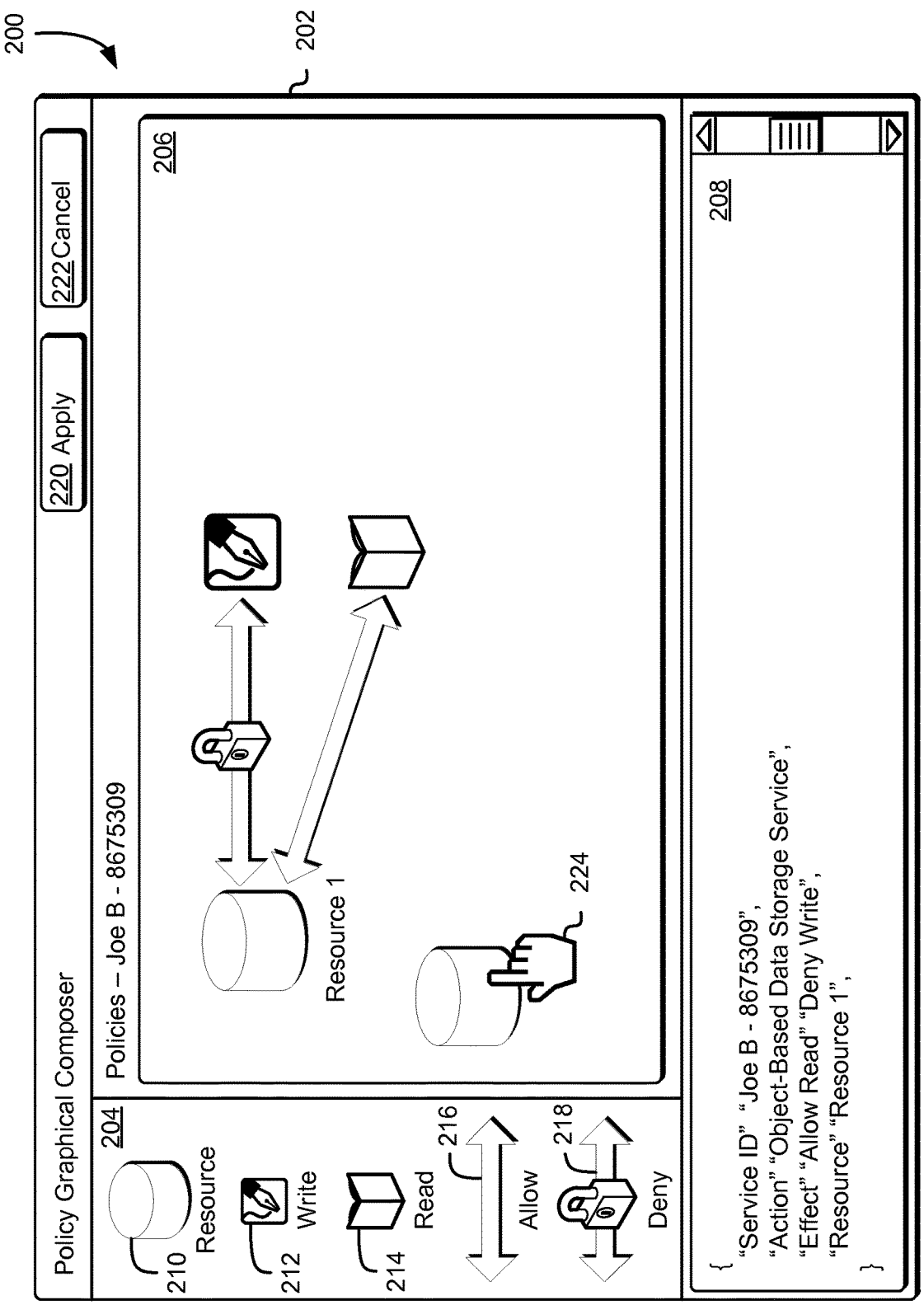
FIG. 2 shows an illustrative example of an environment that includes a graphical composer configured to enable a user to create a graphical representation of a policy and to utilize the graphical representation to create a new policy in accordance with at least one embodiment.

As noted above, a customer may access, through an interface, a graphical composer, which the customer may utilize to generate a graphical representation of a policy and, in turn, create the policy based at least in part on this graphical representation. Accordingly, FIG. 2 shows an illustrative example of an environment 200 that includes a graphical composer 202 configured to enable a user to create a graphical representation of a policy and to utilize the graphical representation of the policy to create a new policy in accordance with at least one embodiment. The graphical composer 202 may include a plurality of components, which a customer may use to generate a graphical representation of a policy and, subsequently, a policy that may be applied to one or more target resources. For instance, in this particular illustrative example, the graphical composer 202 may include three distinct components that may be used to create a graphical representation of a policy. The components that may be included in the graphical composer 202, in this example, include an iconic representation selection window 204, a policy graphical representation window 206 and a policy textual representation window 208, although not all embodiments of the present disclosure will include all such components and additional components may be included within the graphical composer 202 in addition to or as an alternative to the components explicitly described herein. The graphical composer 202 may further be utilized to generate a template usable to create one or more new policies.

The iconic representation selection window 204 may include one or more iconic representations of resources, actions and/or permissions that may be used to create the graphical representation of the policy. For instance, in this particular illustrative example, the iconic representation selection window 204 may include a resource icon 210, a write action icon 212, a read action icon 214, an allow connector 216 and a deny connector 218, although not all embodiments of the present disclosure will include all such iconic representations and additional iconic representations may be included within the iconic representation selection window 204 in addition to or as an alternative to the iconic representations explicitly described herein. For example, the iconic representation selection window 204 may include in addition to, or instead of, the resource icon 210, one or more resource icons for each resource provisioned by the customer. In another example, the iconic representation selection window 204 may include in addition to, or instead of, the allow connector 216 and the deny connector 218, one or more connectors usable to illustrate a conditional connection between a particular resource and an action. For instance, if a conditional connector is used to connect a particular resource to an action, a user may be able to specify a condition, such that if the condition is met, the action may be performable on the specified resource. Otherwise, if the condition is not met, then the action may not be performable on the specified resource.

The resource icon 210 may represent one or more resources provisioned by the customer. For instance, when a customer uses a cursor 224 to select the resource icon 210 and create a graphical representation of a resource in the policy graphical representation window 206, the customer may be able to select the graphical representation of the resource and define one or more attributes of the resource that are to be used in generating the policy. For example, when a customer selects the graphical representation of the resource, a separate window may appear, which may include one or more input boxes that the customer may utilize to define which resource provisioned by the customer will be subject to this new policy. As illustrated in FIG. 2, the customer has introduced a resource to the policy graphical representation window 206 and has renamed the resource as "Resource 1." The name of the resource may correspond to a known resource provisioned by the customer and maintained by the computing resource service provider. While the use of a separate window for defining one or more attributes of a graphical representation of a resource are used throughout the present disclosure for the purpose of illustration, other methods may be used to identify a particular resource that is to be the target of the new policy. For example, as noted above, the resource icon 210 may be replaced with one or more resource icons for each resource provisioned by the customer. In such an instance, a separate window for defining the one or more attributes of the graphical representation of a resource may not be required.

If the graphical composer 202 is utilized to generate a template, as described above, the customer may not be required to define the one or more attributes resources that are to be used in generating the policy. For instance, the customer may introduce a resource to the policy graphical representation window 206 but, instead of defining which provisioned resource is to be utilized (e.g., "Resource 1" as illustrated in FIG. 2), the customer may leave the resource blank. Accordingly, the resource may not include a particular name within the graphical representation window 206. Once the customer has created the template, he/she may utilize the apply button 220 to store the template within a policy data store such that the customer may be able to access this template at a later time and use the template to generate new policies.

The write icon 212 may represent a write action that may be performed by one or more users of a particular resource. For instance, a write action may include creating a new file within a resource, deleting a file within a resource, introducing a file from another source to the resource, moving a file within a resource and the like. Thus, enabling a user to perform a write action on a resource may include allowing the user to create, modify and delete any content from within a particular resource, including the resource itself. The read icon 214, alternatively, may represent a read action that may be performed by one or more users of a particular resource. For instance, a read action may include accessing one or more files within the resource without the ability to write, modify or delete any of these files.

The allow connector 216 may be used to graphically represent an allowable connection between a particular resource and an action. For instance, as illustrated in FIG. 2 in the policy graphical representation window 206, a customer has used an allow connector 216 to connect a graphical representation of a read action to a graphical representation of a resource (e.g., "Resource 1"). Accordingly, this may graphically represent that a particular user is allowed to perform one or more read actions related to the resource. Alternatively, the deny connector 218 may be used to graphically represent a connection between a particular resource and an action wherein the action may not be performed. For instance, as illustrated in the policy graphical representation window 206, a customer has used a deny connector 218 to connect a graphical representation of a write action to a graphical representation of a resource (e.g., "Resource 1"). Accordingly, this may graphically represent that a particular user is denied the ability to perform one or more write actions related to the resource.

The policy graphical representation window 206 may be used by the customer to create a graphical representation of a policy that is to be used to define a level of access, for one or more users, to one or more resources provisioned by the customer. For instance, the customer may utilize the interface, provided by the policy management service, to select one or more users that are to be impacted by creation of a policy through the graphical composer 202. Accordingly, when the customer accesses the graphical composer 202 from the interface, the customer may see, as illustrated in FIG. 2, which users are to be affected by the policy represented in the policy graphical representation window 206.

To generate a graphical representation of a policy using the policy graphical representation window 206, a customer may utilize a cursor 224 to select one or more iconic representations from the iconic representation selection window 204 and introducing the selected iconic representations into the policy graphical representation window 206. Accordingly, the customer may manipulate the one or more iconic representations within the policy graphical representation window 206 to connect resources to actions and create a graphical representation of a policy. For instance, as illustrated in FIG. 2, a customer may have utilized a cursor 224 to select the resource icon 210 to introduce a graphical representation of a resource (e.g., "Resource 1"). Further, the customer may have utilized the cursor 224 to select the write icon 212 and the read icon 214 to introduce a graphical representation of these two actions to the policy graphical representation window 206. Subsequently, the customer may have used the allow connector 216 and the deny connector 218 to connect the graphical representation of the resource to the graphical representations of the read and write actions. Thus, a customer may be able to view the policy graphical representation window 206 to visualize a particular policy for one or more users and make adjustments as needed.

The graphical composer 202 may further include a policy textual representation window 208, which may be configured to display the generated policy in a structured format (e.g., JSON, XML, SecPol, Amazon Web Services Access Policy Language etc.) that may be read by the targeted resources to implement the one or more policies. In an embodiment, the policy management service is configured to utilize the graphical representation of a policy within the policy graphical representation window 206 to generate a permission model that may be simulated to determine whether there are any conflicts and/or errors associated with the policy. This permission model may be created by converting the graphical representation of the policy into a textual representation of the policy. This textual representation of the policy may be written in a structured format, such that the policy may read and applied by the policy management service to perform the simulation. Accordingly, the policy management service may be configured to utilize the policy textual representation window 208 to display the textual representation of the policy that is graphically represented within the policy graphical representation window 206.

Once the customer has created a graphical representation of a policy that he or she wants to implement for one or more resources and users, the customer may use the cursor 224 to select the apply button 220. Accordingly, the policy management service may serialize the permission model into a structured format to create the policy and apply this newly created policy to the applicable resources. For instance, once the policy has been created, the policy may be stored within a centralized authentication service provided by the computing resource service provider. This centralized authentication service may be configured to provide the newly created policy to one or more services once the user has been properly authenticated by the authentication service. Alternatively, the policy management service may transmit the newly created policy to the applicable services where the resources may be maintained. Thus, when a user attempts to access a resource within an applicable service, the applicable service may refer to the policy to determine whether the user is authorized to access the resource. If the customer does not want to utilize this graphical representation of a policy to create a new policy, the customer may select the cancel button 222 to exit the graphical composer 202. Accordingly, the policy management service may discard the graphical representation of the policy created by the customer without applying this policy to any resources provisioned by the customer.

Figure 3:
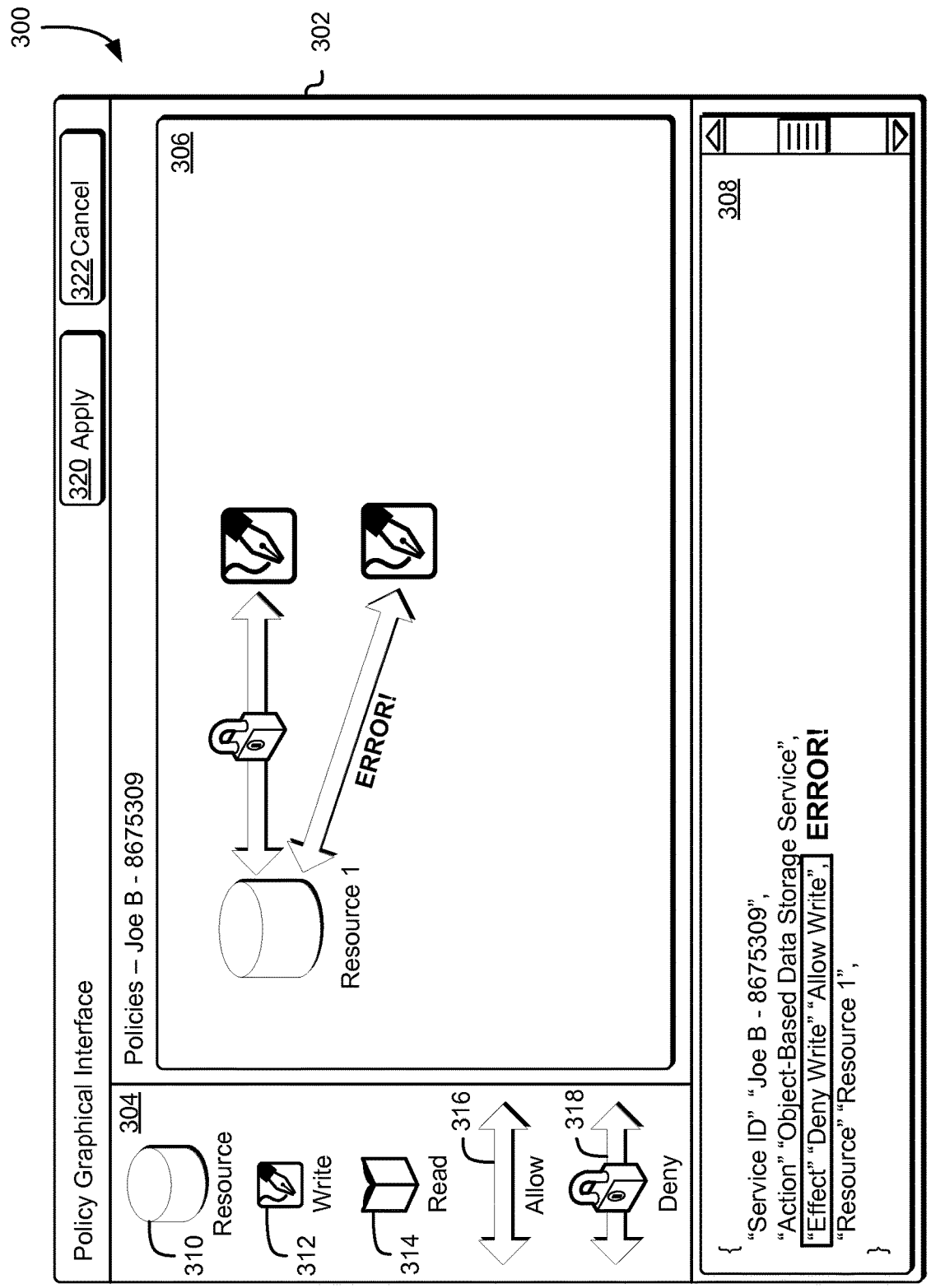
FIG. 3 shows an illustrative example of an environment that includes a graphical composer configured to produce an error message if a graphical representation of a policy results in one or more conflicts or errors in accordance with at least one embodiment.

As noted above, the policy management service may be configured to utilize the graphical composer to generate a permission model based at least in part on the graphical representation of a policy. The policy management model may utilize this graphical representation of the policy to perform one or more simulations to determine whether there are any conflicts and/or errors associated with the policy. Accordingly, FIG. 3 shows an illustrative example of an environment 300 that includes a graphical composer 302 configured to produce an error message if a graphical representation of a policy results in one or more conflicts or errors in accordance with at least one embodiment. The graphical composer 302 is similar to the graphical composer illustrated in FIG. 2 and described above. For instance, the graphical composer 302 may include three distinct components that may be used to create a graphical representation of a policy. The components that may be included in the graphical composer 302, in this example, include an iconic representation selection window 304, a policy graphical representation window 306 and a policy textual representation window 308. Further, the resource icon 310, the write icon 312, the read icon 314, the allow connector 316, the deny connector 318 may be similar to the icons illustrated in FIG. 2. Similarly, the graphical composer 302 may include the apply button 320 and the cancel button 322, which may be similar to the buttons illustrated in FIG. 2. However, in this illustrative example, the creation of a graphical representation of a policy has resulted in an error, which may preclude the policy management service from creating the policy and applying the policy to the applicable resources provisioned by the customer.

As illustrated in FIG. 3, a customer may create a graphical representation of a policy that includes one or more conflicting elements. For instance, a customer may use a connector, such as the allow connector 316 or the deny connector 318 to connect a graphical representation of a resource, created using a resource icon 310, to an action within the policy graphical representation window 306. However, a conflict may be generated if a customer uses an allow connector 316 and a deny connector 318 to connect a resource to the same action, such as the write action illustrated in FIG. 3. While the use of a conflict based at least in part on different connectors being utilized to connect a resource to the same action is used throughout the present disclosure for the purpose of illustration, other conflicts and errors may be created when utilizing the graphical composer 302 to generate a new policy. For example, an error may occur if a customer creates a graphical representation of a policy that includes repeated connections, such as two or more connections that would enable a user to write to the same resource.

As noted above, when a customer creates a graphical representation of a policy within the policy graphical representation window 306, the policy management service may use this graphical representation to generate a permission model (e.g., a non-graphical representation of the policy). Subsequently, the policy management service may simulate this permission model to determine whether the permission model includes any conflicting or erroneous policy statements. If the permission model includes any conflicting or erroneous policy statements, the policy management service may transmit one or more notifications to the graphical composer 302 that may cause the graphical composer 302 to display the source of the conflict and/or error. Additionally, the graphical composer 302 may display one or more messages to inform the customer that the policy could not be created due to the errors/conflicts.

For instance, as illustrated in FIG. 3, the graphical composer 302 has displayed two error messages as a result of the graphical representation of a policy created by a customer. First, the graphical composer 302 may display an error message within the policy graphical representation window 306 to demonstrate which connection resulted in an error. In this illustrative example, the customer has specified, through the policy graphical representation window 306, that a user is both allowed and denied to perform write operations on Resource 1. Since the policy management service has determined that this is a conflict, the graphical composer 302 may be instructed to display where the conflicting connection is located. This may enable the customer to remove the connection or take other remedial actions to address the conflict and/or error. Second, the graphical composer 302 may display an error message within the policy textual representation window 308 to demonstrate where within the textual representation of the policy the error is located. In this illustrative example, the graphical composer 302 has highlighted the relevant portion of textual representation of the policy that includes the error. Additionally, the graphical composer 302 has displayed in large, bold letters the word "error" next to the highlighted portion of the textual representation of the policy to further call attention to the error.

While the use of a textual error message and highlighting of portions of a textual representation of the policy is used extensively throughout the present disclosure for the purpose of illustration, other methods to demonstrate the source of an error or conflict may be used to inform the customer of an issue with his or her graphical representation of a policy. For example, the graphical composer 302 may be configured to change the color of the resources, actions, connectors and other elements within the policy graphical representation window 306. In another example, the graphical composer 302 may be configured to change the color of the segment of the textual representation of the policy that includes a conflicting or erroneous statement within the policy textual representation window 306. As such, the graphical composer 302 may be configured to utilize any visual (e.g., colors, shapes, text, etc.) and/or audio stimuli to inform the customer of an error and/or conflict that may exist as a result of the graphical representation of the policy created by the customer.

Figure 4:
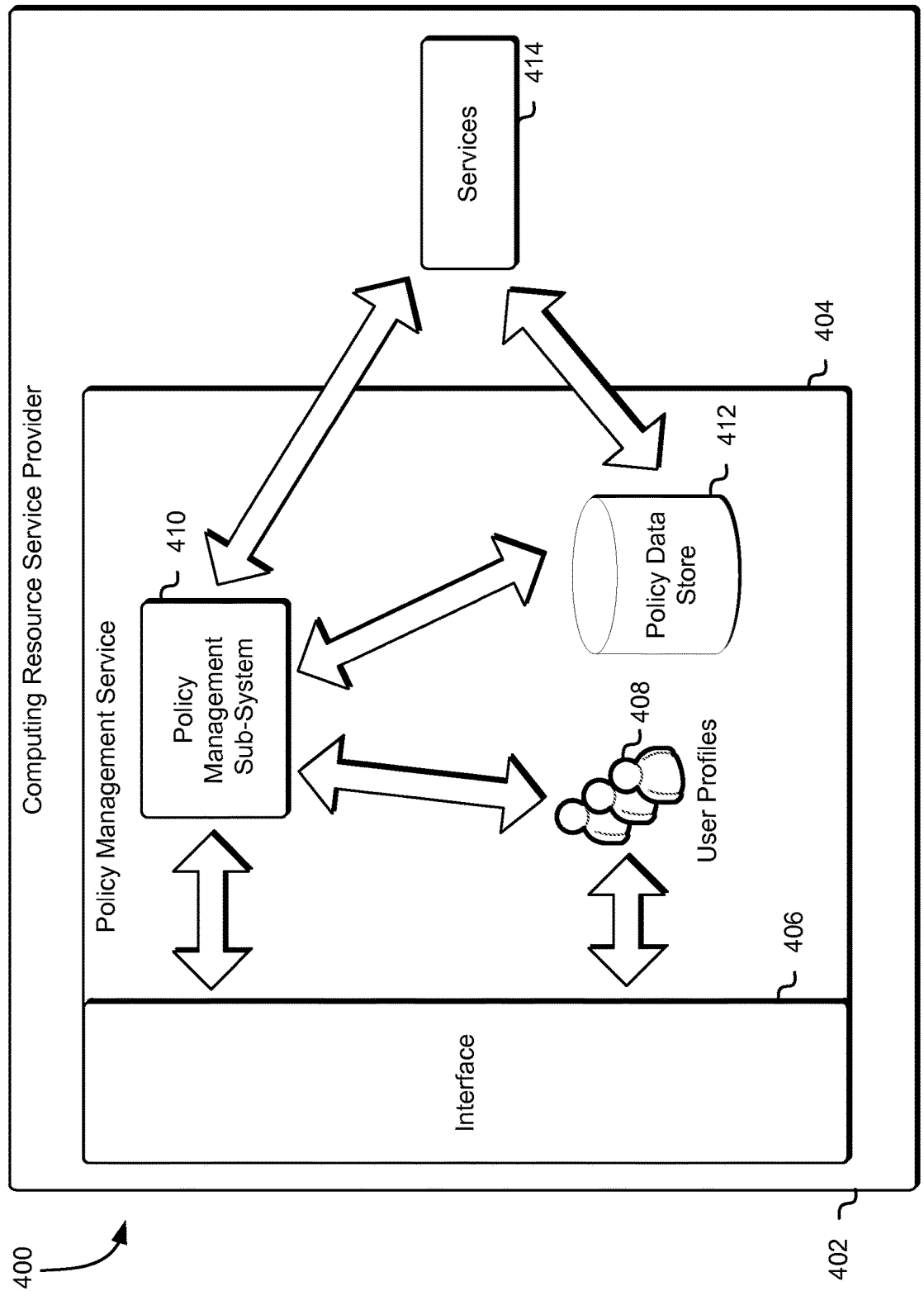
FIG. 4 shows an illustrative example of an environment that includes a plurality of components of a policy management service in accordance with at least one embodiment.

As noted above, the policy management service may be configured to enable customers to utilize an interface to access a graphical composer, which may be used to generate one or more policies that may be applicable to resources across other services provided by the computing resource service provider. Accordingly, FIG. 4 shows an illustrative example of an environment 400 that includes a plurality of components of a policy management service 404 provided by a computing resource service provider 402 in accordance with at least one embodiment. The policy management service 404 may provide customers and other delegated users who have been granted administrative permissions by a customer with an interface 406 that may enable the customer or a delegated user to access the policy management service 404. A customer or a delegated user may utilize the interface 406 through one or more communications networks, such as the Internet. The interface 406 may comprise certain security safeguards to ensure that the customer or delegated user has authorization to access the policy management service 404. For instance, in order to access the policy management service 404, a customer may need to provide a username and a corresponding password or encryption key when using the interface 406. Additionally, requests (e.g., API calls) submitted to the interface 406 may require an electronic signature generated using a cryptographic key such that the electronic signature is verifiable by the policy management service 404, such as by an authorization system (not shown).

Through the interface 406, the customer or delegated user may be able to view his or her resources, including a listing of all users authorized to access each of his or her resources. Accordingly, the customer or delegated user may use the interface 406 to access a user profile data store 408 to create and manage one or more users and view one or more attributes of each user (e.g., first name and last name, location, phone number, etc.). Additionally, through the interface 406, the customer or delegated user may select a user profile or a group of user profiles from the user profile data store 408 and access a graphical composer to create one or more resource policies and define a level of access to one or more resources for a user or a group of users. Accordingly, once the customer or delegated user has defined the applicable user policies through the graphical composer, the graphical composer may transmit one or more executable instructions to a policy management sub-system 410 which may cause the policy management sub-system 410 to generate a permission model based at least in part on a graphical representation of the user policies created by the customer or delegated user.

The policy management sub-system 410 may be configured to utilize the permission model to perform one or more simulations and determine whether the permission model includes one or more errors or conflicts. If one or more errors or conflicts are detected, the policy management sub-system 410 may transmit one or more notifications to the graphical composer within the interface 406 that may cause the graphical composer to display one or more error messages and deny creation of the policy. Accordingly, a customer or delegated user may again utilize the graphical composer to address the errors and/or conflicts. This may cause the graphical composer to again transmit executable instructions to the policy management sub-system 410 to utilize the revised graphical representation of the policy to create a new permission model and to perform one or more simulations utilizing the new permission model.

If the policy management sub-system 410 does not detect any errors or conflicts after performing one or more simulations utilizing the permission model, the policy management sub-system 410 may enable the customer or delegated user to verify that he or she wants to create a policy based at least in part on the graphical representation of the policy created within the graphical composer. For example, a customer or delegated user may select an apply button within the graphical composer to acknowledge that he or she wants to create a policy based at least in part on the graphical representation of the policy he or she has created. Accordingly, the policy management sub-system 410 may serialize the permission model into an appropriate structured format (e.g., a format that is readable and by one or more services where the resources may be located to enable the one or more services to enforce the policy) and create the policy. The policy management sub-system may include the generated policy in the one or more applicable user profiles within the user profile data store 408 and may persistently store the generated policy within a policy data store 412. Once the policy has been created and persistently stored within the policy data store 412, the policy management sub-system 410 may either transmit the generated policy to one or more services 414 where the applicable resources may be located or may transmit one or more API calls to the policy data store 412 to provide the generated policy to the one or more services 414. Accordingly, the one or more services 414 may enforce the generated policy and grant users or deny users the ability to perform one or more operations using resources provisioned by the customer or managed by one or more delegated users.

At any time, the customer or delegated user may access the graphical composer through the interface 406 to view and/or modify any existing policy that may be persistently stored within the policy data store 412. For instance, a customer or delegated user may utilize the interface 406 to access the user profile data store 408 to select a user profile and, from the selected user profile, identify a policy that has been applied to the user profile. Accordingly, the customer or delegated user may select the policy and access the graphical composer. The interface 406 may transmit one or more executable instructions to the policy management sub-system 410, which may cause the policy management sub-system 408 to access the policy data store 412 to obtain the selected policy and utilize the textual representation within the selected policy to cause the graphical composer to display a graphical representation of the policy. Thus, the customer or delegated user may be able to review a graphical representation of an existing policy, even if the existing policy was not originally created using the graphical composer within the interface 406.

Figure 5:
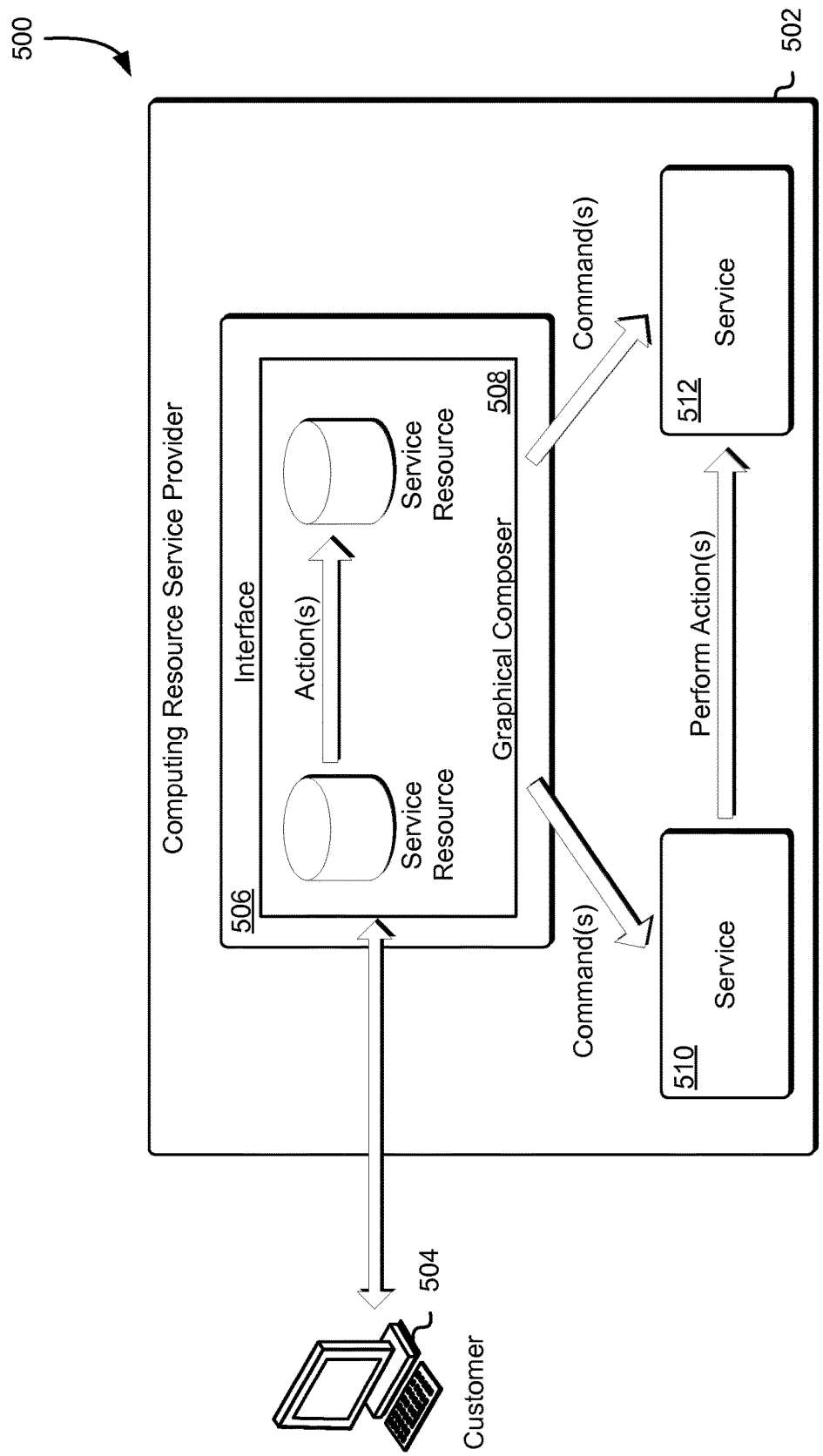
FIG. 5 shows an illustrative example of an environment in which various embodiments can be implemented.

As noted above, a computing resource service provider may not only provide, through a policy management service, a graphical composer to generate one or more policies but may also provide a second graphical composer, which a customer may utilize to integrate his or her resources across various services to support creation of one or more applications. Accordingly, FIG. 5 shows an illustrative example of an environment 500 in which various embodiments can be implemented. In the environment 500, a computing resource service provider 502 may provide various computing resource services 510, 512 to customers of the computing resource service provider 502. The computing resource service provider 502 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider 502 may utilize its computing hardware resources to operate one or more services 510, 512. Such services 510, 512 may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), policy management services, program execution services and other services. The services 510, 512 may be used by customers to support a wide variety of activities, such as operating a website, operating enterprise systems supporting an organization, operating one or more distributed applications, distributed computation and/or other activities.

Accordingly, as illustrated in FIG. 5, the environment 500 includes a customer 504. The customer 504 may be an individual or organization that could utilize one or more services 510, 512 provided by the computing resource service provider 502 to remotely manage computing resources to support his or her operations, such as webpage development, application development or database management. The customer 504 may, through a customer computing device, access an interface 506 provided by computing system service provider 502 to create one or more applications that may be used to support the customer's needs. For instance, in an embodiment, the customer 504 may access a graphical composer 508, through the interface 506, to create a graphical representation of an application, which the computing resource service provider 502 may utilize to construct a domain specific language (DSL) representation of the requested application and perform one or more simulations to determine whether the desired application includes one or more errors and/or conflicts that may affect its performance. Examples of DSLs that may be used include HyperText Markup Language (HTML), Logo, Verilog, matrix laboratory (MATLAB) language, GNU Octave and the like; although this list is not exhaustive any suitable DSL may be utilized to create a textual representation of the application to be simulated.

If the computing resource service provider 502 detects any errors and/or conflicts as a result of performing one or more simulations of the DSL representation of the requested application, the computing resource service provider 502 may transmit one or more notifications to the graphical composer 508 that may cause the graphical composer 508 to display, through highlighting or other methods, the source of the errors and/or conflicts. This may enable the customer 504 to use the graphical composer 508 to modify the graphical representation of the requested application in order to address the discovered errors and/or conflicts. Additionally, the computing resource service provider 502 may cause the graphical composer 508 to enable the customer 504 to request provisioning, through the graphical composer 508, of additional resources if necessary to support the requested application and the customer 504 has not previously provisioned such resources.

Once the customer 504 has utilized the graphical composer 508 to create a graphical representation of an application (e.g., one or more operations that may be performed utilizing resources across various services) and the computing resource service provider 502 has determined that the DSL representation of this application results in no conflicts and/or errors, the computing resource service provider 502 may utilize a compiler and/or a code generation mechanism to create executable code for the application. For instance, the executable code may be written in an executable language such as Java, C++, Objective C, non-Objective C, C #, Ruby and the like. Once the application has been created, the computing resource service provider 502 may transmit one or more commands to the relevant services 510, 512 in order to integrate these services 510, 512 and enable actions to be performed among these services 510, 512. For instance, as illustrated in FIG. 5, the creation of an application through the graphical composer 508 may enable a customer 504 or other user of the application to use the application to cause a first service 510 to perform one or more actions that affect a second service 512. For example, a customer 504 may use the created application to request creation of a topic that may include one or more notifications, transfer the one or more notifications included in the topic to an existing queue and, as a result of a triggering event or sufficient passage of time, transmit the one or more notifications from the queue to a logical data container or virtual machine instance for execution. The executable code for the application may cause the application to transmit relevant commands to a notification service, a managed queuing service, an object-based data storage service and a virtual computer system service to integrate these services and the applicable resources within to perform the requested operations.

Figure 6:
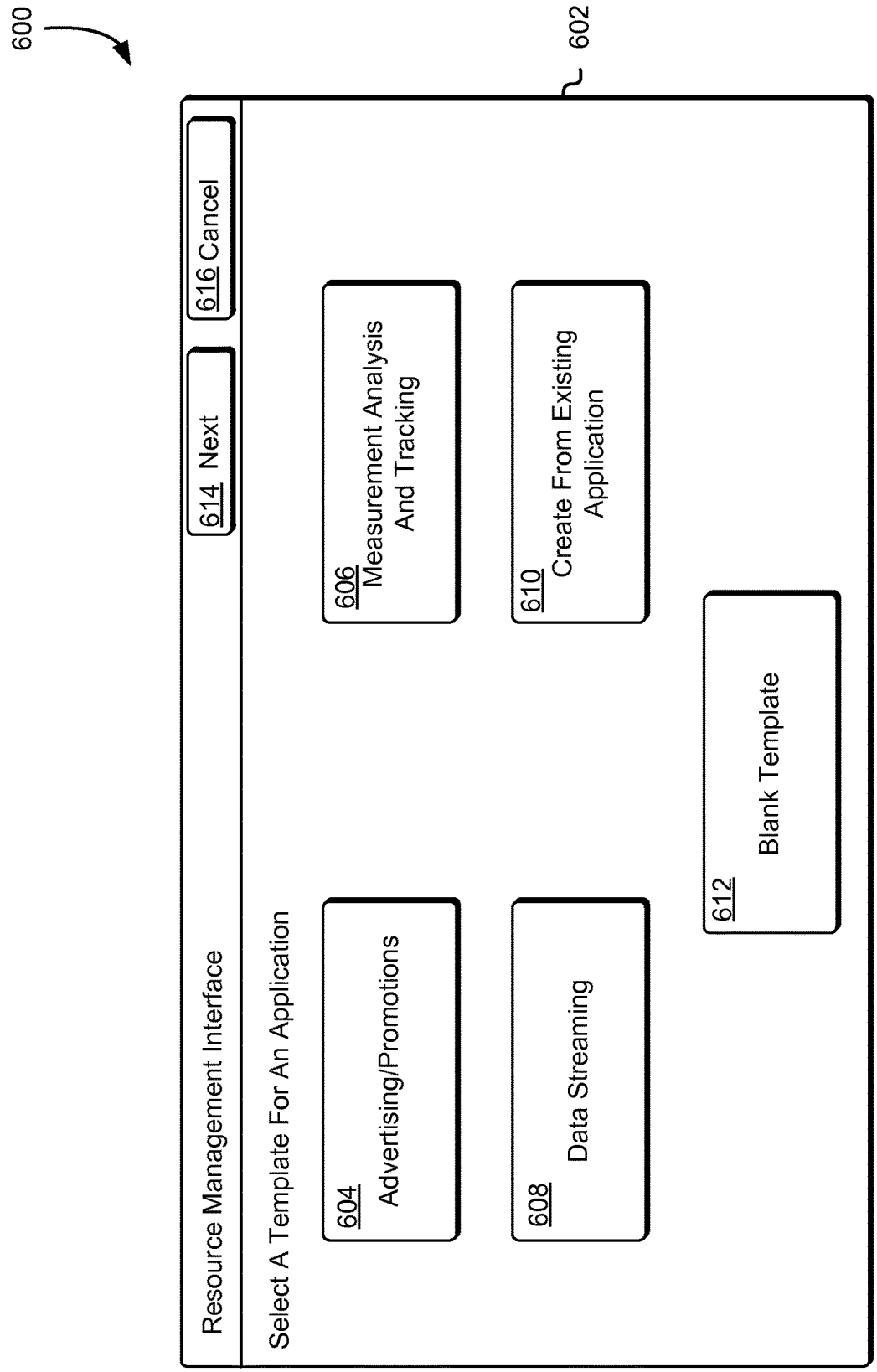
FIG. 6 shows an illustrative example of an environment that includes an interface that can be used to select a template for generating an application in accordance with at least one embodiment.

As noted above, the computing resource service provider may provide an interface, which customers and other users may utilize to access a graphical composer to define one or more features of a new application. In an embodiment, the interface is configured to provide a customer or other user with the option to select a template from a set of one or more templates, which may be used to create applications having different functionality within the graphical composer. Accordingly, FIG. 6 shows an illustrative example of an environment 600 that includes an interface 602 that can be used to select a template for generating an application in accordance with at least one embodiment. The interface 602 may include a plurality of templates, which a customer may use to create an example graphical representation of an application that the customer may use as a baseline for his or her desired application. For instance, in this particular illustrative example, the interface 602 may include five distinct template options that may be used to create an example graphical representation of an application. The template options that may be included in the interface 602, in this example, include an advertising/promotions template option 604, a measurement analysis and tracking template option 606, a data streaming template option 608, a create from existing application option 610 and a blank template option 612, although not all embodiments of the present disclosure will include all such template options and additional template options may be included within the interface 602 in addition to or as an alternative to the template options explicitly described herein.

The advertising/promotions template option 604 may be selected by a customer desiring to create a new application that is configured to distribute advertisements and/or promotions to users of the application. For instance, a customer may want to push notifications to users of the application to provide information regarding new products or promotions. Further, the application may be used to manage a user loyalty program, wherein a user is rewarded for utilizing the application to purchase goods provided by the customer. Accordingly, an advertising/promotions template may include one or more sample operations that may be used to integrate resources within a notifications service and a managed queuing service which may push notifications to one or more subscribers, as well as one or more sample operations that may be used to integrate an object-based data storage service and a database service to track user purchases and loyalty rewards. These sample operations and applicable resources may then be graphically represented within the graphical composer, where the customer may manipulate these sample operations to create his or her own customized application.

The measurement analysis and tracking template option 606 may be selected by a customer desiring to create a new application that may be used to obtain one or more measurements, analyze these one or more measurements and provide useful information related to these measurements obtained over time. For instance, a customer may provide users with an application that enables users to track their blood pressure at any time and obtain useful information regarding their measurements. Accordingly, a measurement analysis and tracking template may include one or more sample functions that may be used to integrate resources within an object-based data storage service to redundantly store users' measurements, resources within a virtual computer system service for performing one or more analyses based at least in part on the received measurements and a database within a database service for listing relevant data and user information. Similar to the advertising/promotions template option 604 described above, these sample functions and applicable resources may then be graphically represented within the graphical composer, where the customer may manipulate these sample functions to create his or her own customized application.

The data streaming template option 608 may be selected by a customer desiring to create a new application that may be used by other users to remotely access data over a network. For instance, the customer may enable users of the application to redundantly store their data within a customer's data store and access this data remotely through the application. Accordingly, the data streaming template may include one or more sample functions that may be used to integrate resources within an object-based data storage service to redundantly store a user's data and resources within a data archive service to archive any stored data that is used infrequently. The customer may utilize the graphical composer to modify these sample operations to fit his or her business needs.

The create from existing application option 610 may be selected by a customer desiring to utilize a graphical representation of a previously created application as a template to create a new application. For instance, if a customer selects this option 610, the interface 602 may transmit one or more API calls to a template repository to obtain a listing of applications previously created by the customer. Accordingly, the interface 602 may provide a new graphical user interface to the customer, which may include this listing of previously created applications. The customer may utilize this graphical user interface to select an existing application and cause the interface to obtain the selected application and utilize the graphical composer to generate a graphical representation of the selected application. Thus, the customer may be able to utilize the graphical representation of the existing application to add, modify and/or remove operations and resources to create a new application. Additionally, the create from existing application option 610 may be selected by the customer to enable reuse of existing resources to create new applications or modify existing applications.

The blank template option 612 may be selected by a customer desiring to access the graphical composer that includes no graphical representations. Thus, if a customer selects this option 612, the graphical composer may not include graphical representations of resources or operations. This may enable the customer to utilize the graphical composer to create a new application that differs substantially from any of the other templates provided by the computing resource service provider through the interface 602.

Once the customer has selected an appropriate template that may be used to create a graphical representation of a sample application, the customer may utilize a next button 614 to access the graphical composer. Accordingly, based at least in part on the customer's selection of a template from the interface 602, the graphical composer may or may not include graphical representations of resources and functions that may be integral to the creation of a new application. Alternatively, if a customer no longer desires to create a new application, the customer may utilize the cancel button 616 to exit the interface 602.

Figure 7:
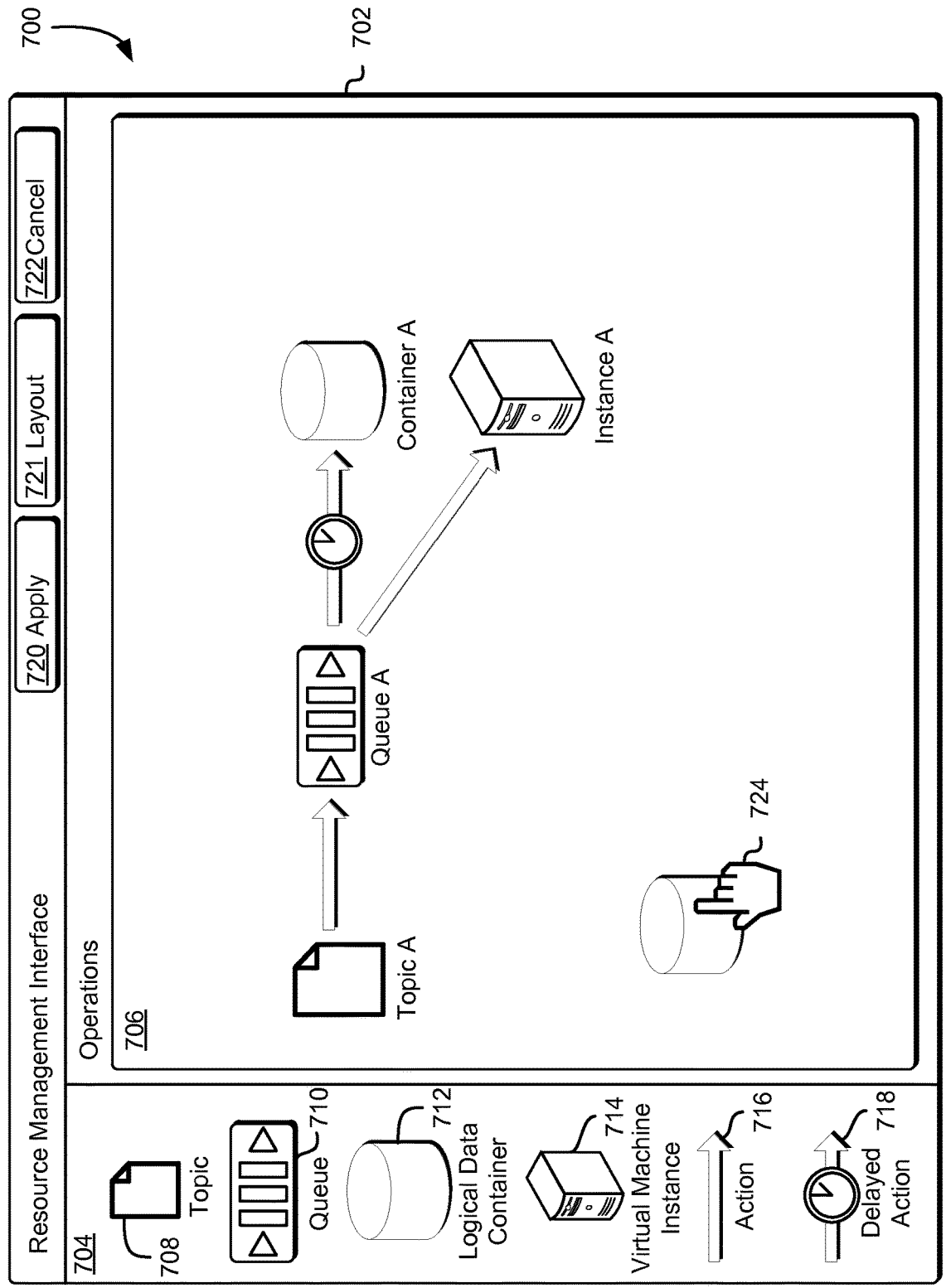
FIG. 7 shows an illustrative example of an environment that includes a graphical composer that can be used to create a graphical representation of an application in accordance with at least one embodiment.

As noted above, the customer may utilize an interface to access a graphical composer that may be used, by the customer, to create a graphical representation of one or more functions and resources that may be used to integrate various services and create an application that may support the customer's business needs. Accordingly, FIG. 7 shows an illustrative example of an environment 700 that includes a graphical composer 702 that can be used to create a graphical representation of an application in accordance with at least one embodiment. The graphical composer 702 may include a plurality of components, which a customer of the computing resource service provider may use to generate a graphical representation of one or more operations that may be performed by an application and, subsequently, an application that may be provided to users to support the customer's business needs. For instance, in this particular illustrative example, the graphical composer 702 may include two distinct components that may be used to create a graphical representation of operations for an application. The components that may be included in the graphical composer 702, in this example, include an iconic representation selection window 704 and an operations graphical representation window 706, although not all embodiments of the present disclosure will include all such components and additional components may be included within the graphical composer 702 in addition to or as an alternative to the components explicitly described herein.

The iconic representation selection window 704 may include one or more iconic representations of resources, actions and/or other entities that may be used to create the graphical representation of the operations to be included within the application. For instance, in this particular illustrative example, the iconic representation selection window 704 may include a topic icon 708, a queue icon 710, a logical data container icon 712, a virtual machine instance icon 714, an action connector 716 and a delayed action connector 718, although not all embodiments of the present disclosure will include all such iconic representations and additional iconic representations may be included within the iconic representation selection window 704 in addition to or as an alternative to the iconic representations explicitly described herein. For example, the iconic representation selection window 704 may include in addition to, or instead of, the resource icons (e.g., the topic icon 708, the queue icon 710, the logical data container icon 712 and the virtual machine instance icon 714) as illustrated in FIG. 7, one or more icons for each type of resource that may be provided by the computing resource service provider and made available to the customer.

In an embodiment, the iconic representation selection window 704 is populated with one or more iconic representations of resources, actions and/or other entities based at least in part on the template selected by the customer. For instance, as illustrated in FIG. 7, if a customer selects from the interface an advertising/promotions application template, the iconic representations that may be included in the iconic representation selection window 704 may correspond to the one or more resources, actions and entities that may be used to create one or more operations needed to create an advertising/promotions application. Accordingly, the customer may use a cursor 724 to select the topic icon 708 to introduce a graphical representation of a topic that may include one or more notifications into the operations graphical representation window 706. The customer may then select the graphical representation of the topic to identify which topic, from a notification service, is to be used as part of the desired operation. In similar fashion, the customer may use the cursor 724 to introduce additional elements into the operations graphical representation window 706 and graphically define one or more operations necessary to support the application that is to be created.

The iconic representations of resources that may be included within the iconic representation selection window 704 may further include iconic representations of resources that are provisioned by the customer. For instance, the customer may be an entity that may have provisioned and/or maintains one or more topics comprising a plurality of notifications within a notification service, one or more queues within a managed queuing service, one or more logical data containers within an object-based data storage service and one or more virtual machine instances within a virtual computer system service. Thus, as illustrated in FIG. 7, the graphical composer 702 may be configured to include a topic icon 708, a queue icon 710, a logical data container icon 712 and a virtual machine instance icon 714 to enable the customer to integrate these resources and their associated services for the purpose of defining operations of the desired application.

In an embodiment, the iconic representation selection window 704 is populated with iconic representations of every resource that is made available through the one or more services provided by the computing resource service provider. Accordingly, when a customer uses a cursor 724 to insert a graphical representation of a resource into the operations graphical representation window 706, the graphical composer 702 may transmit one or more API calls to the applicable service that is used to provision and maintain this type of resource to determine whether the customer has provisioned one or more resources from the service. If the customer does not have any resources of this type associated with his or her account, as will be described in greater detail below in connection with FIG. 8, the graphical composer 702 may display a graphical user interface, which may be configured to enable the customer to provision the necessary resource.

The action connector 716 and the delayed action connector 718 may be used to graphically connect graphical representations of one or more resources to graphical representations of other resources. For instance, as illustrated in FIG. 7, a customer has used an action connector 716 to graphically connect Topic A to Queue A within the operations graphical representation window 706. Accordingly, the graphical composer 702 may be configured to interpret this graphical representation of the connection between Topic A and Queue A as an operation wherein the topic (e.g., Topic A) is added to the queue, Queue A. Alternatively, the customer may select the delayed action connector 718 to graphically connect a graphical representation of a resource to graphical representations of other resources such that the intended operation (e.g., action) is performed after a specified period of time (e.g., a delay).

As the customer creates graphical representations of one or more features that are to be implemented for the desired application, the computing resource service provider, through a resource management sub-system, may convert these graphical representations into a model that includes DSL (e.g., textual) representations of the one or more operations defined by the customer. Accordingly, the resource management sub-system may perform one or more simulations of these operations to determine whether any errors and/or conflicts exist. If such errors and/or conflicts exist, the resource management sub-system may cause the graphical composer 702 to inform the customer of the errors and/or conflicts (e.g., highlight relevant operations, display informative messages, etc.). The customer may be permitted to modify the graphical representation of the offending operations, at which point the resource management sub-system may again perform simulations of these modified operations.

Once the customer has created a graphical representation of the one or more operations that he or she wants to implement for the desired application, and no errors or conflicts exist, the customer may use the cursor 724 to select the apply button 720. Accordingly, the computing resource service provider, through the resource management sub-system, may instantiate the model of the application by generating executable code in a programming language to create the application and enable the application to transmit one or more commands to applicable computing resources and services. However, if the customer does not want to utilize this graphical representation of the one or more operations to create a new application, the customer may select the cancel button 722 to exit the graphical composer 702. Accordingly, the resource management sub-system may discard the graphical representation of the operations created by the customer without applying these operations to any applicable resources.

Figure 9:
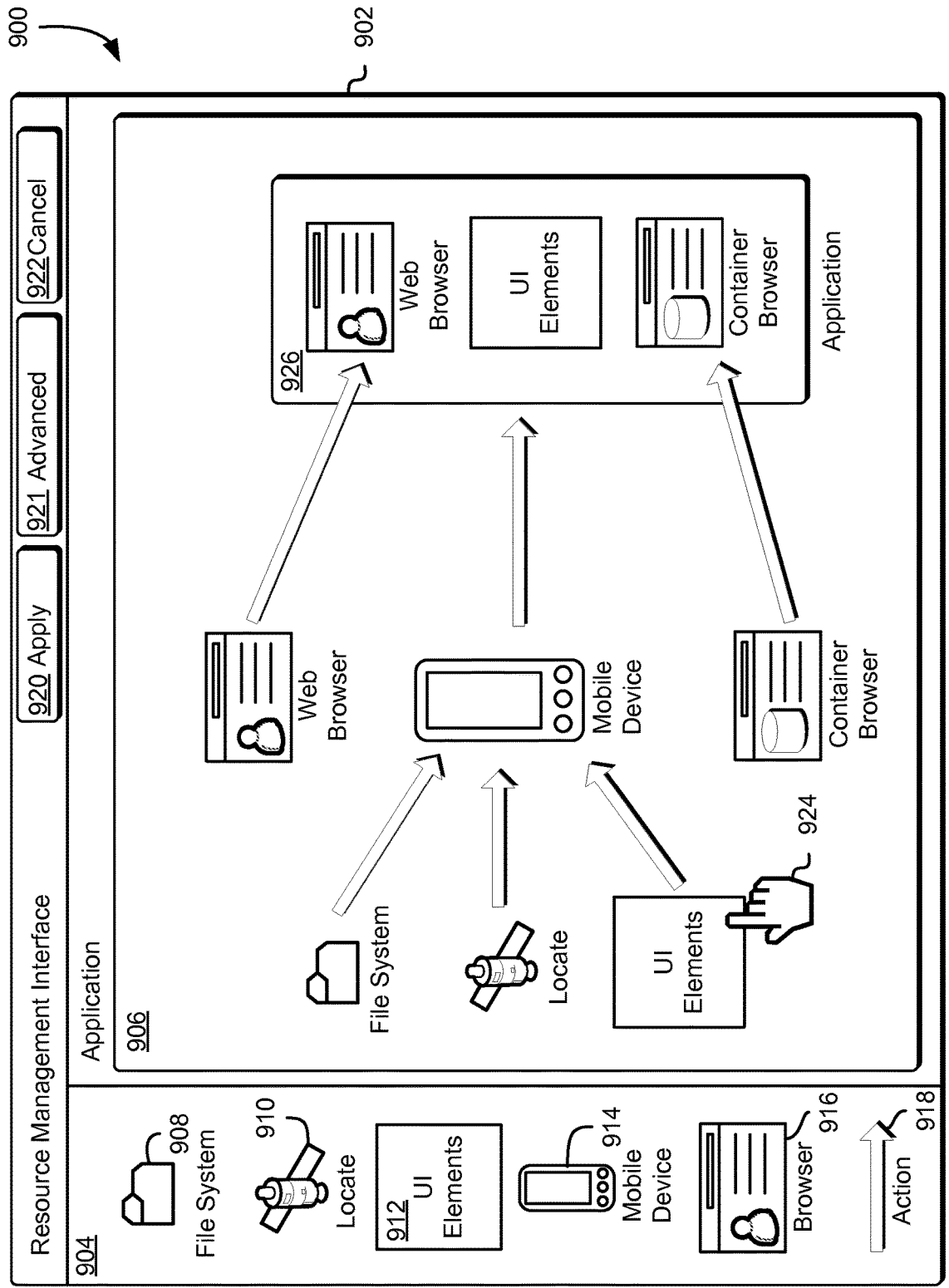
FIG. 9 shows an illustrative example of an environment that includes a graphical composer that can be used to create a graphical representation of a workflow required to enable users of the application to access one or more resources in accordance with at least one embodiment.

The graphical composer 702 may further include an application layout button 721, which the customer may select to access a view of the application layout, such as the graphical representation of the application layout illustrated in FIG. 9 and described in greater detail below. For instance, when a customer selects the application layout button 721, the customer may be able to view a graphical representation of the workflow required to enable users of the application to access the one or more resources, as well as the application layout. Accordingly, the customer may be able to modify the graphical representation of the application layout within this application layout view of the application to include one or more other features of the application. Any changes that the customer implements within this application layout of the application may cause the resource management sub-system to modify the graphical representation of the one or more operations within the graphical representation window 706. Thus, a customer may be able to view a graphical representation of the application layout and the one or more operations that may be performed in support of the application, as well as the one or more resources necessary to carry out these one or more operations.

Figure 8:
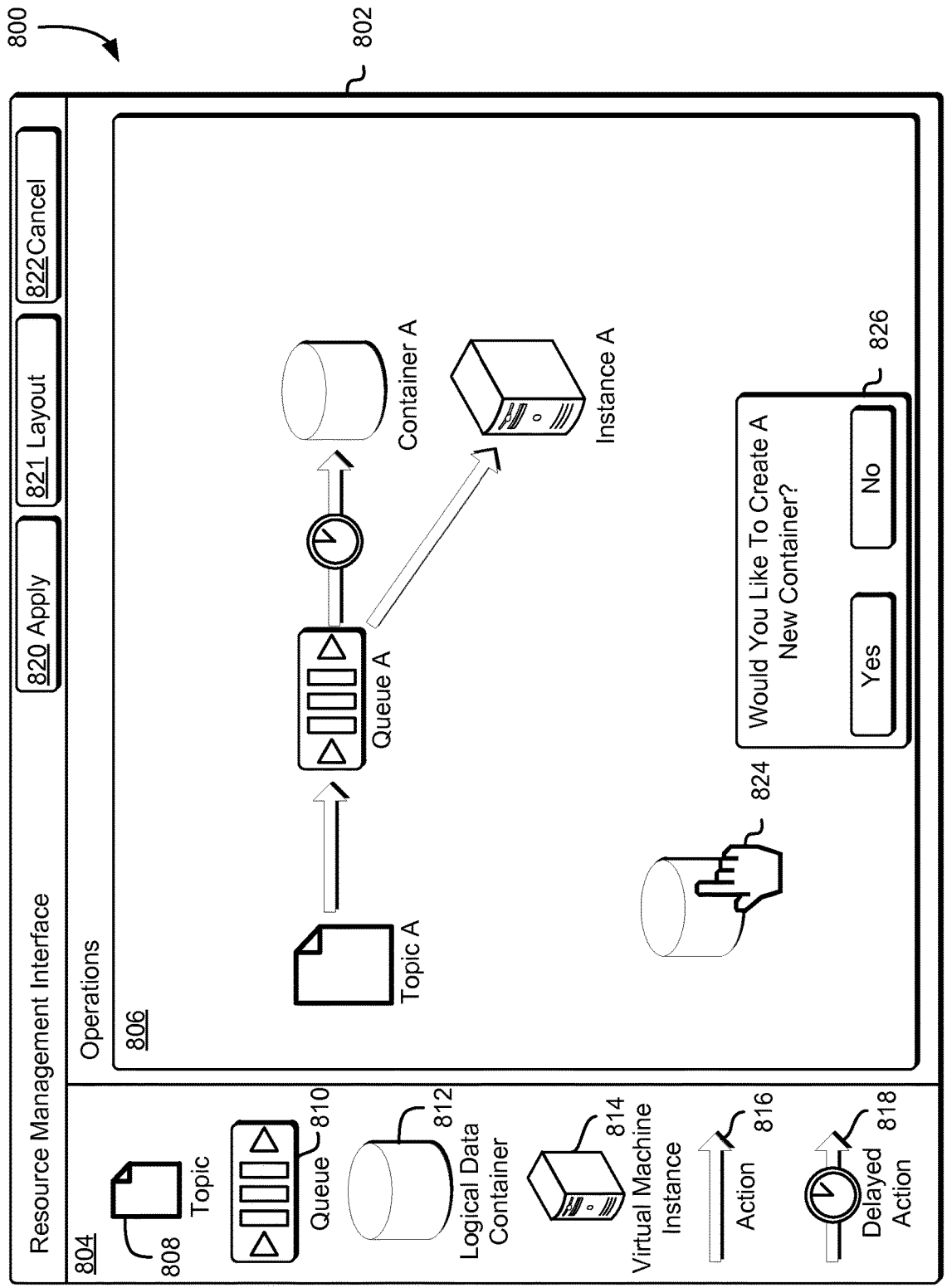
FIG. 8 shows an illustrative example of an environment that includes a graphical composer that can be used to create a graphical representation of an application and to acquire one or more resources as needed in accordance with at least one embodiment.

As noted above, if a customer introduces one or more graphical representations of resources into an operations graphical representation window of a graphical composer to create a graphical representation of one or more operations, a resource management sub-system may determine whether the customer has provisioned such resources. Accordingly, FIG. 8 shows an illustrative example of an environment 800 that includes a graphical composer 802 that can be used to create a graphical representation of an application and to acquire one or more resources as needed in accordance with at least one embodiment. The graphical composer 802 is similar to the graphical composer illustrated in FIG. 7 and described above. For instance, the graphical composer 802 may include two distinct components that may be used to create a graphical representation of an application. The components that may be included in the graphical composer 802, in this example, include an iconic representation selection window 804 and an operations graphical representation window 806. Further, the graphical composer 802 may include a topic icon 808, a queue icon 810, a logical data container icon 812, a virtual machine instance icon 814, an action connector 816 and a delayed action connector 818, which may be similar to the icons described above in connection with FIG. 7. The graphical composer 802 may also include an apply button 820, an application layout button 821, and a cancel button 822. These buttons may be similar to the buttons described above in connection with FIG. 7. However, in this illustrative example, the introduction of a resource (e.g., a second logical data container, as illustrated in FIG. 8) has resulted in the resource management sub-system discovering that the customer has not provisioned such a resource, which may preclude the resource management sub-system from creating an application.

As illustrated in FIG. 8, a customer may create a graphical representation of one or more operations that includes one or more resources that have not been previously provisioned by the customer. For instance, a customer may use a cursor 824 to introduce a graphical representation of a resource, such as a logical data container as illustrated in FIG. 8, into the operations graphical representation window 806. However, the customer may not have previously provisioned this particular resource, which may be required in order to support the desired one or more operations graphically represented within the operations graphical representation window 806. While a resource that has not been provisioned is used extensively throughout the present disclosure to illustrate an issue that may occur during the definition of one or more operations, other issues may arise when utilizing the graphical composer 802 to generate a new application. For example, an issue may arise if one or more actions cannot be performed on a target resource (e.g., unauthorized users are not permitted to perform one or more actions on a particular resource, etc.).

As noted above, when a customer creates a graphical representation of one or more operations within the operations graphical representation window 806, the resource management sub-system may use this graphical representation to generate a DSL model of the desired application. Subsequently, the resource management sub-system may perform one or more simulations of this DSL model to determine whether the DSL model includes one or more resources that have not been provisioned by the customer. If the DSL model includes any such resources, the resource management sub-system may transmit one or more notifications to the graphical composer 802 that may cause the graphical composer 802 to display which one or more resources may need to be provisioned. Additionally, the graphical composer 802 may provide a graphical user interface 824, which may be used to inform the customer of the missing resources and to enable the customer to provision and/or acquire these resources.

For instance, as illustrated in FIG. 8, the graphical composer 802 has generated a graphical user interface 826 as a result of the graphical representation of the one or more operations created by a customer. In this illustrative example, the customer has introduced, through the operations graphical representation window 806, a new logical data container in addition to the logical data container identified as "Container A" and a virtual machine instance identified as "Instance A." Since the resource management sub-system has determined that the customer has not provisioned a second distinct logical data container from an object-based data storage service, the graphical composer 802 may be instructed to provide a graphical user interface 826 to not only inform the customer that he or she has not provisioned this resource, but also enable the customer to utilize the graphical user interface 826 to provision the missing resource. This may enable the customer to provision the necessary resources or take other remedial actions to address this issue. While a graphical user interface 826 is used extensively throughout the present disclosure to illustrate a method that may be used to inform a customer of any issues and to enable the customer to address such issues, other methods may be utilized. For example, in an embodiment, the graphical composer 802 is configured to highlight any graphical representations of missing resources and/or target users included within the operations graphical representation window 806. Alternatively, or additionally, the graphical composer 802 may be configured to use a textual message other than within the graphical user interface 826 to call attention to the missing resources and/or target users.

In an alternative embodiment, the graphical composer 802 does not generate the graphical user interface 826 if the resource management sub-system has determined that the customer has not provisioned one or more resources included in the graphical representation of the one or more operations created by the customer. For instance, the resource management sub-system, upon determining that the customer has not provisioned one or more resources included in the graphical representation of the one or more operations, may provision the necessary one or more resources on behalf of the customer automatically. For instance, the resource management sub-system may provision these necessary one or more resources by submitting one or more API calls to the services that host the resources. Thus, the customer may no longer be required to specify whether he/she would like to provision these one or more resources before constructing the DSL model and instantiating the DSL model if the model does not include any errors and/or conflicts.

As noted above, the computing resource service provider may enable customers and other users to utilize a second graphical composer to define one or more elements of the application that may be used to enable a user of the application to interact with one or more resources provisioned by a customer. Accordingly, FIG. 9 shows an illustrative example of an environment 900 that includes a graphical composer 902 that can be used to create a graphical representation of a workflow required to enable users of the application to access one or more resources in accordance with at least one embodiment. The graphical composer 902 may include a plurality of components, which a customer of the computing resource service provider may use to generate a graphical representation of one or more actions that may be performed to create a layout of an application. For instance, in this particular illustrative example, the graphical composer 902 may include two distinct components that may be used to create a graphical representation of actions for generating the layout of the application. The components that may be included in the graphical composer 902, in this example, include an iconic representation selection window 904 and an application graphical representation window 906, although not all embodiments of the present disclosure will include all such components and additional components may be included within the graphical composer 902 in addition to or as an alternative to the components explicitly described herein.

In an embodiment, the iconic representation selection window 904 is populated with one or more iconic representations of device elements (e.g., elements that may be included within a device, elements that may be included within the application, etc.) and actions that may be performed to generate the layout of the application. A device element may be a component or collection of components installed on a device configured to perform one or more functions or, in the case of executable code, cause the device to perform one or more functions. Example device elements include, but are not limited to applications, processes, routines, sensors (e.g., GPS receiver, microphone, camera, touchscreen or other input device, and the like). For example, a GPS receiver installed on a device, configured to obtain a global position for the device, may be a device element. As another example, the device may include one or more browsers for accessing one or more websites. For instance, as illustrated in FIG. 9, if a customer selects from the interface an advertising/promotions application template, the iconic representations that may be included in the iconic representation selection window 904 may correspond to the one or more device elements, devices that may be used to access the application and/or actions that may be used to create a layout of an application that may be used for, for example, advertising and/or promotional purposes. Accordingly, the customer may use a cursor 924 to select the mobile device 914 to introduce a graphical representation of a mobile device into the application graphical representation window 906. The customer may then select the graphical representation of the mobile device to identify which mobile devices may be targeted to run the application. In similar fashion, the customer may use the cursor 924 to introduce additional elements into the application graphical representation window 906 and graphically define one or more actions to create a layout of the application that is to be created.

The iconic representations of device elements that may be included within the iconic representation selection window 904 may further include iconic representations of elements (e.g., functions) that may be included in an application which may be running on a mobile device and/or other such devices. For instance, the mobile device application may be configured to utilize one or more resources installed on the mobile device to provide information or other resources to the application which may be used to enable the application to provide content to the user of the mobile device. Thus, as illustrated in FIG. 9, the graphical composer 902 may be configured to include a file system icon 908, a locate icon 910 and a user interface (UI) elements icon 912 to enable the application to obtain certain information from the mobile device in order to provide the user of the mobile device with customized content, as well as to enable the application to obtain other input from the user through one or more user interfaces installed on the mobile device.

The file system icon 908 may be used to represent a file system that may be operating on a mobile device that may be accessed by the application. For instance, the application may be configured to access the file system of a user's mobile device to redundantly store one or more resources necessary to support the application. This may include, but is not limited to, one or more graphical elements (e.g., icons, wallpapers, etc.), data files, as well as one or more files comprising executable code, which may be used to launch the application on the mobile device and to enable the application to perform one or more operations on the mobile device.

The locate icon 910 may be used to represent one or more operations that may be performed by the mobile device to determine the location of the mobile device. For instance, an application may cause the mobile device to utilize a global positioning system (GPS) receiver installed on the mobile device to obtain one or more coordinates corresponding to the location of the mobile device. Accordingly, these coordinates may be provided to the application, which may perform one or more operations based at least in part on the location of the device. For example, if the application is configured to provide a user with advertisements and/or promotional information for a particular retail store, the application may utilize the location of the mobile device to determine, based at least in part on an analysis of a repository of locations, whether the user is near the particular store and, if so, provide one or more advertisements to the user.

The UI elements icon 912 may be used to represent one or more user interface elements that may be installed on the mobile device and that may be used by the application to receive input from the user. For instance, UI elements that may be used by an application to receive input from the user may include touchscreen input, audio input, input from one or more buttons installed on the mobile device and the like. Additionally, as will be described below, the application layout 926 may include one or more locations within the application wherein a user of the application may use one or more of these UI elements to interact with the application.

The iconic representation selection window 904 may further include a mobile device icon 914, which may be used to represent a mobile device and/or other such devices which may be used to manage components of an application that may enable a user of the device to interact with the application. In an embodiment, a customer utilizing the graphical composer is able use the mobile device icon 914 to specify either all possible mobile devices or a particular mobile device. For instance, if a customer uses the cursor 924 to select the mobile device icon 914 and introduce a graphical representation of a mobile device into the application graphical representation window 906, the customer may be able to specify, by selecting the graphical representation of the mobile device using the cursor 924, which devices of the one or more devices the customer would like to target the application to. For example, the customer may specify that this graphical representation of the application may be applicable to all iPhone® devices. Alternatively, the customer may specify that this graphical representation of the application may be applicable for any device that may have the application installed on the device. While the present disclosure includes a mobile device icon 914 and a corresponding graphical representation of a mobile device for the purpose of illustration, the graphical composer 902 may be configured to include iconic representations and corresponding graphical representations of other devices, such as laptops, servers, hard drives, smart watches and the like.

The browser icon 916 may be used to represent one or more browsers, provided by the computing resource service provider or otherwise installed on the user's device, which may be used to access one or more resources made available to the user through the application. For instance, when a customer uses the cursor 924 to select the browser icon 916 and, accordingly, introduce a graphical representation of a browser into the application graphical representation window 906, the customer may be able to select this graphical representation of a browser and determine what kind of browser and which capabilities of the browser are to be utilized. For example, as illustrated in FIG. 9, the customer has introduced two distinct browsers (e.g., web browser and container browser) that may be included within the application layout 926. A web browser may be used by an application to enable a user to access one or more websites, servers or virtual machine instances (e.g., "Instance A" as illustrated in FIG. 7) over a communications network, such as the Internet. The container browser, alternatively, may be used by an application to enable a user to access and/or view the structure of one or more logical data containers (e.g., "Container A" as illustrated in FIG. 7) made available by the customer to users of the application. While the use of a web browser and a container browser is used extensively throughout the present disclosure for the purpose of illustration, a customer may utilize the browser icon 916 to introduce any kind of browser that may be available for accessing a variety of resources provided by the computing resource service provider.

The action connector 918 may be used to graphically connect graphical representations of one or more elements (e.g., a file system, a locate operation, UI elements, a mobile device, one or more browsers) to graphical representations of other elements and/or an application layout 926. For instance, as illustrated in FIG. 9, a customer has used an action connector 918 to graphically connect a file system, a locate operation and UI elements to a mobile device to indicate that the mobile device may be configured to enable an application to access the file system, determine the location of the mobile device and receive input from one or more user interfaces installed on the mobile device. Additionally, an action connector 918 has been used to graphically connect the mobile device to the application layout 926 to illustrate the connection between the application and the mobile device. The action connector 918 is further used to illustrate that the application layout 926 may include two distinct browsers that are not inherently part of the mobile device. For instance, the two browsers may be provided by the computing resource service provider or other provider.

Once the customer has created a graphical representation of the application layout and interactions between the application and the mobile device, the customer may select the apply button 920 to cause the resource management sub-system to generate a DSL model of the application to perform one or more simulations to determine whether the application includes one or more errors and/or conflicts. If the resource management sub-system does not identify any errors and/or conflicts, then the resource management sub-system may utilize a compiler to create executable code specific to one or more device platforms that may be executed by the selected mobile device platform. For instance, if the customer specified, through the graphical representation of the mobile device, that the mobile device to be used includes one or more iPhone® devices, the resource management sub-system may utilize the compiler to create executable code in a format that may be executed by the iOS® operating system. Thus, a customer may be able to specify which operating system or platform the application may be installed on and cause the compiler to create executable code in a format that may be understood by the specified operating system or platform. As may be contemplated, the examples of application execution targets described herein are illustrative examples and other such execution targets may be considered as within the scope of the present disclosure. If the customer does not want to utilize this graphical representation of the application layout, the customer may select the cancel button 922 to exit the graphical composer 902.

The graphical composer 902 may further include an advanced button 921, which the customer may select to access an advanced view of the application, such as the graphical representation of the one or more operations to be performed by the application illustrated in FIGS. 7 and 8.

For instance, when a customer selects the advanced button 921, the customer may be able to view a graphical representation of the one or more resources that are to be provisioned in order to support the application. Accordingly, the customer may be able to modify the graphical representation of the one or more operations within this advanced view of the application to include one or more other resources (e.g., reuse existing resources provisioned by the customer, provision new resources, etc.) and define alternative and/or additional operations that may be performed through use of the application. Any changes that the customer implements within this advanced view of the application may cause the resource management sub-system to modify the graphical representation of the application layout within the graphical representation window 906. Thus, a customer may be able to view a graphical representation of the application layout and the one or more operations that may be performed in support of the application, as well as the one or more resources necessary to carry out these one or more operations.

In an embodiment, once the customer has created the graphical representation of the application layout and the interactions between the application and mobile device, the resource management sub-system will generate the DSL model of the application and identify the one or more resources that may be required to support the one or more operations to be performed through the application. For instance, based at least in part on the graphical representation of the application layout, the resource management sub-system may determine whether the customer has provisioned the necessary resources to support the one or more operations to be performed. Accordingly, the resource management sub-system may utilize these resources and provision any other resources to support the one or more operations as needed.

Figure 10:
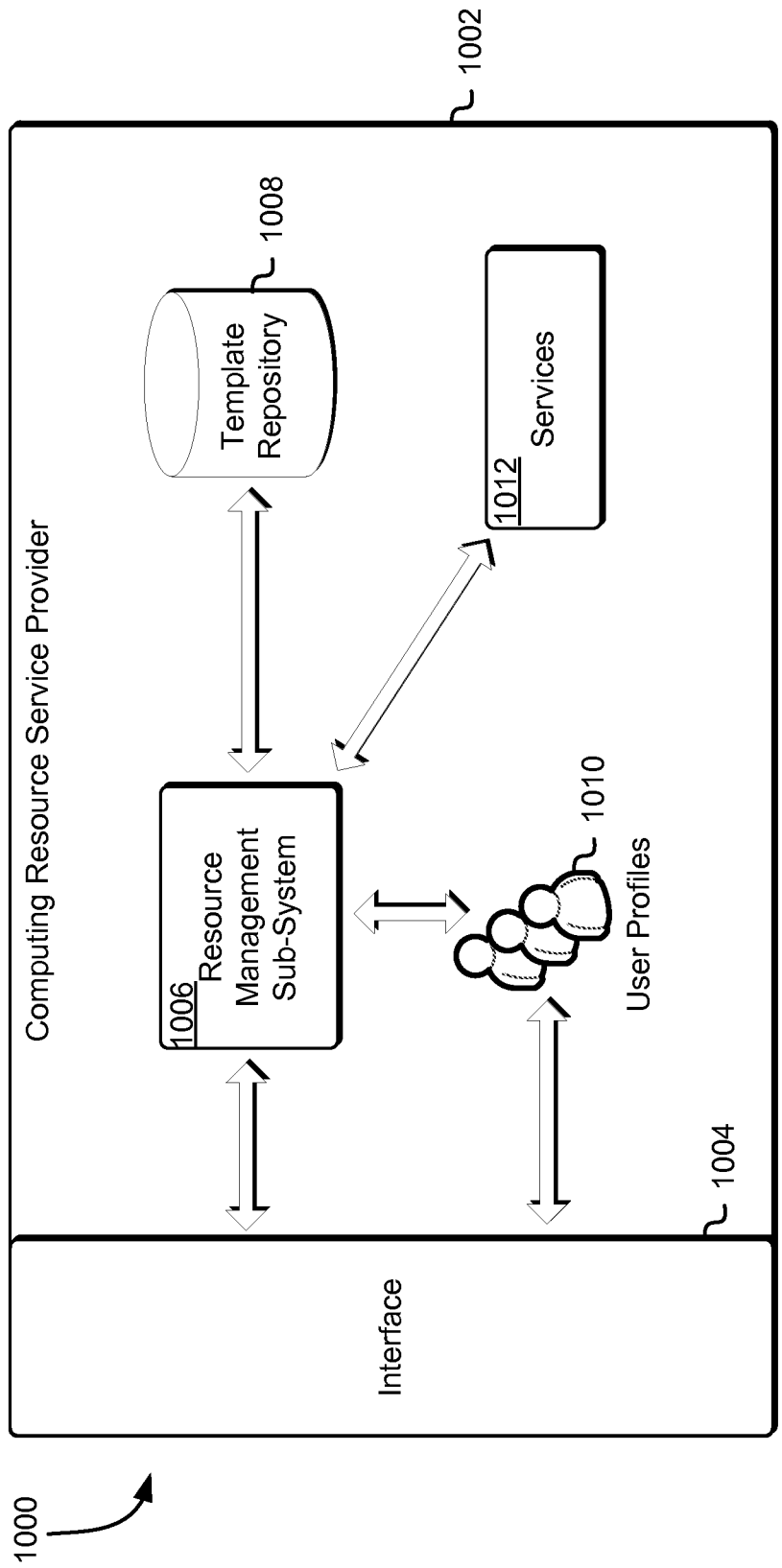
FIG. 10 shows an illustrative example of an environment that includes a plurality of components that can be used to generate an application in accordance with at least one embodiment.

As noted above, the computing resource service provider may enable customers and other users to utilize an interface to access a graphical composer, which may be used to generate one or more applications and the operations used to implement these applications. Accordingly, FIG. 10 shows an illustrative example of an environment 1000 that includes a plurality of components that can be used to generate an application in accordance with at least one embodiment. The computing resource service provider 1002 may provide customers and other delegated users who have been granted administrative permissions by a customer with an interface 1004 that may enable the customer or a delegated user to access a resource management sub-system 1006. A customer or a delegated user may utilize the interface 1004 through one or more communications networks, such as the Internet. The interface 1004 may comprise certain security safeguards to ensure that the customer or delegated user has authorization to access the resource management sub-system 1006. For instance, in order to access the resource management sub-system 1006, a customer may need to provide a username and a corresponding password or encryption key when using the interface 1004. Additionally, requests (e.g., API calls) submitted to the interface 1004 may require an electronic signature generated using a cryptographic key such that the electronic signature is verifiable by the resource management sub-system 1006 or the computing resource service provider 1002, such as by an authorization system (not shown).

Through the interface 1004, the customer or delegated user may be able to access one or more services 1012 to interact with his or her resources, as well as to obtain a listing of all users authorized to access each of his or her resources. Accordingly, the customer or delegated user may use the interface 1004 to access a user profile data store 1010 to create and manage one or more users and view one or more attributes of each user (e.g., first name and last name, location, phone number, etc.). For instance, a customer or delegated user may access the user profile data store 1010 to create one or more user profiles of users that may use the application to receive notifications transmitted from a notification service at the behest of the customer. Additionally, the customer or delegated user may utilize the interface 1004 to access a graphical composer to integrate one or more resources in the services 1012 managed by the computing resource service provider 1002 to support his or her business needs and to create a layout for the application that is to be made available to other users through their own computing devices.

In order to access the graphical composer through the interface 1004, the customer or delegated user may be required to select a template which may be used to create a baseline graphical representation of a desired application. For instance, as described above in connection with FIG. 6, the interface 1004 may present the customer or delegated user with one or more template options, which the customer or delegated user may utilize to create his or her application. For example, a customer or delegated user may select an advertising/promotions template option to cause the graphical composer to display a graphical representation of one or more operations of an example advertising/promotions application. In order to present these options to the customer or delegated user, the resource management sub-system 1006 may transmit one or more API calls to a template repository 1008 to obtain a listing of one or more templates available to create example graphical representations of operations and application layouts within the graphical composer. Accordingly, the resource management sub-system 1006 may provide this listing to the interface 1004, which may be configured to then present the listing of these available templates to the customer or delegated user for his or her selection. Additionally, the resource management sub-system 1006 may be configured to access a user profile for the customer or delegated user from the user profile data store 1010 to obtain an additional listing of applications previously created by the customer or delegated user. This may enable the customer or delegated user to utilize the interface 1004 to select an existing application that he or she may utilize as a template within the graphical composer to generate a new application or to modify the existing application.

Once the customer or delegated user has selected an appropriate template through the interface 1004, the customer or delegated user may access the graphical composer to utilize the selected template to generate a graphical representation of one or more operations that may be used within an application, as well as the layout for the application that is to be provided to other users. Accordingly, once the customer or delegated user has utilized the graphical composer to define these one or more operations and application layouts, the graphical composer may transmit one or more executable instructions to the resource management sub-system 1006 which may cause the resource management sub-system 1006 to generate a DSL model based at least in part on the graphical representation of the operations and application layout created by the customer or delegated user.

The resource management sub-system 1006 may be configured to utilize the DSL model to perform one or more simulations and determine whether the DSL model includes one or more errors/conflicts, includes resources that have not been previously provisioned or includes one or more affected users (e.g., recipients, subscribers, etc.) that do not have user profiles. If any issues are detected, the resource management sub-system 1006 may transmit one or more notifications to the graphical composer within the interface 1004 that may cause the graphical composer to display one or more messages and/or graphical user interfaces that include the nature of the detected issues and deny creation of the application. Accordingly, a customer or delegated user may again utilize the graphical composer to address these issues. This may cause the graphical composer to again transmit executable instructions to the resource management sub-system 1006 to utilize the revised graphical representation of the one or more operations to create a new DSL model and to perform one or more simulations utilizing the new DSL model.

If the resource management sub-system 1006 does not detect any issues after performing one or more simulations utilizing the DSL model, the resource management sub-system 1006 may, through the graphical composer, enable the customer or delegated user to verify that he or she wants to create an application based at least in part on the graphical representation of the one or more operations created within the graphical composer. For example, a customer or delegated user may select an apply button within the graphical composer to acknowledge that he or she wants to create an application based at least in part on the graphical representation of the one or more operations he or she has created. Accordingly, the resource management sub-system 1006 may compile the DSL model into an appropriate programming language (e.g., a programming language that is readable and executable by one or more services 1012 where the resources may be located and/or readable and executable by one or more devices where the application is to be installed) and create the application. The resource management sub-system 1006 may persistently store the generated application within the template repository 1008. Once the application has been created and persistently stored within the template repository 1008, the resource management sub-system 1006 may transmit one or more commands to the one or more services 1012 where the applicable resources may be located to integrate these applicable resources and enable interaction among these services 1012 as required when a user utilizes the created application to perform one or more operations as previously defined through the graphical composer.

Figure 11:
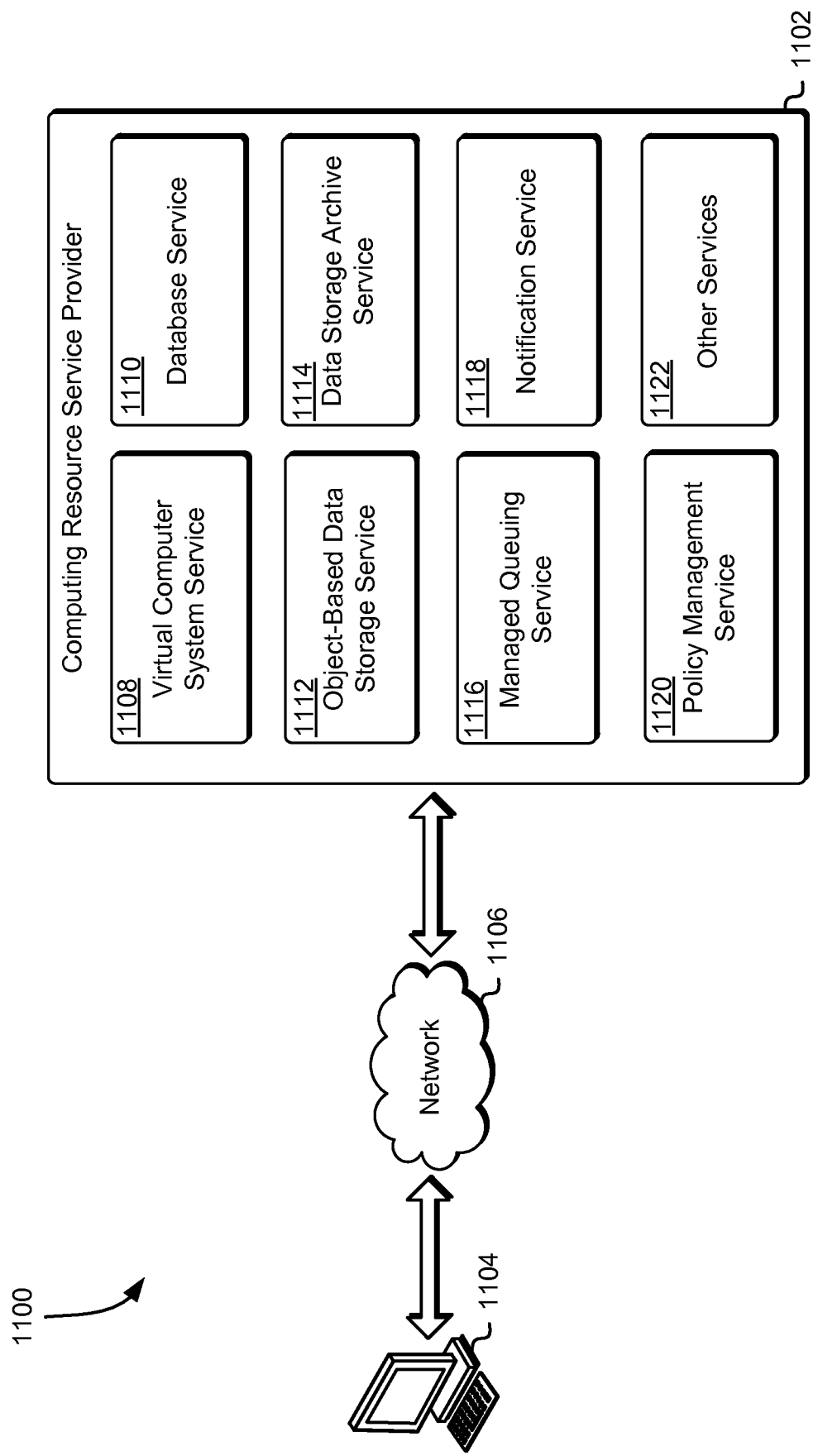
FIG. 11 shows an illustrative example of an environment in which various embodiments can be implemented.

FIG. 11 shows an illustrated example of an environment 1100 in which various embodiments of the present disclosure may be practiced. In the environment 1100, a computing resource service provider 1102 may provide a variety of services to a customer 1104. The customer 1104 may be an organization that may utilize the various services provided by the computing resource service provider 1102 to remotely generate, test and maintain one or more applications and establish and manage one or more policies to define a level of access for users of his or her resources. As illustrated in FIG. 10, the customer 1104 may communicate with the computing resource service provider 1102 through one or more communications networks 1106, such as the Internet. Some communications from the customer 1104 to the computing resource service provider 1102 may cause the computing resource service provider 1102 to operate in accordance with various techniques described herein or variations thereof.

As noted above, a computing resource service provider 1102 may provide various computing resource services to its customers. For instance, in this particular illustrative example, the computing resource service provider 1102 provides at least seven types of services. The services provided by the computing resource service provider, in this example, include a virtual computer system service 1108, a database service 1110, an object-based data storage service 1112, a data storage archive service 1114, a managed queuing service 1116, a notification service 1118, a policy management service 1120 and one or more other services 1122, although not all embodiments of the present disclosure will include all such services and additional services may be provided in addition to or as an alternative to services explicitly described herein.

The virtual computer system service 1108 may be a collection of computing resources configured to instantiate virtual machine instances onto virtual computer systems on behalf of the customers 1104 of the computing resource service provider 1102. Customers 1104 of the computing resource service provider 1102 may interact with the virtual computer system service 1108 to provision and operate virtual computer systems that are instantiated on physical computing devices hosted (e.g., physical hosts) and operated by the computing resource service provider 1102. The virtual computer systems may be used for various purposes, such as to operate as servers supporting a website. Other applications for the virtual computer systems may be to support database applications, electronic commerce applications, business applications and/or other applications.

The database service 1110 may be a collection of computing resources that collectively operate to run one or more databases for one or more customers 1104. Customers 1104 of the computing resource service provider 1102 may operate and manage a database from the database service 1110 by utilizing appropriately configured API calls. This, in turn, may allow a customer 1104 to maintain and potentially scale the operations in the database.

The object-based data storage service 1112 may comprise a collection of computing resources that collectively operate to store data for a customer 1104. The data stored in the data storage service 1112 may be organized into data objects. The data objects may have arbitrary sizes except, perhaps, for certain constraints on size. Thus, the object-based data storage service 1112 may store numerous data objects of varying sizes. The object-based data storage service 1112 may operate as a key value store that associates data objects with identifiers of the data objects which may be used by the customer to retrieve or perform other operations in connection with the data objects stored by the object-based data storage service 1112. Access to the object-based data storage service 1112 may be through appropriately configured API calls.

The data storage archive service 1114 may comprise a collection of computing resources that collectively operate to provide storage for data archiving and backup of customer data. The data storage archive service 1114 may thus be configured to persistently store data that may be infrequently accessed and for which long retrieval times are acceptable to a customer 1104 utilizing the service. A customer 1104 may interact with the data storage archive service 1114 to generate one or more archives. Each archive may represent one or more data files that may be combined to form the archive. Accordingly, a customer 1104, through appropriately configured API calls to the service, may upload and retrieve archives from the data storage archive service 1114 and monitor the retrieval of these archives, as each retrieval job may typically require several hours to complete.

The managed queuing service 1116 may be a collection of computing resources configured to enable customers 1104 to store one or more messages in queues for use by one or more services provided by the computing resource service provider 1102. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 1118 may be a collection of computing resources configured to enable customers 1104 to send and receive notifications through a communications network 1106. A customer 1104 may utilize an interface, provided by the computing resource service provider 1102, to create or subscribe to one or more subjects to which one or more messages may be published through. For instance, a customer 1104 may use the interface to create a new subject and subscribe to this subject by specifying that any messages published to the subject may be transmitted to a particular location (e.g., electronic mail address, one or more servers, an existing queue within the managed queuing service 1116, etc.). Accordingly, when a customer 1104 publishes a message to the subject, the message may be transmitted to each recipient subscribed to the subject.

The policy management service 1120 may provide a variety of services to enable customers 1104 to define a level of access to other services, such as those illustrated in FIG. 10, provided by the computing resource service provider 1102 and to define a level of access to resources provided by the customers 1104 and other entities. Accordingly, a customer 1104 may access the policy management service 1120 to create and manage one or more users and groups that may utilize the services provided by the computing resource service provider 1102. A customer 1104 may utilize the policy management service 1120 to generate one or more policies, which may be used to define a level of access to resources and services.

To generate these one or more policies, a customer 1104 may access a graphical composer provided by the policy management service 1120 to create a graphical representation of one or more policies. Accordingly, the policy management service 1120 may utilize this graphical representation of the one or more policies to create a permission model, which the policy management service 1120 may utilize to simulate the requested one or more policies. If the policy management service 1120, through the simulation of the permission model, detects one or more errors and/or conflicts within the model, the policy management service 1120 may cause the graphical composer to demonstrate the particular elements of the graphical representation of the one or more policies that are causing the one or more errors and/or conflicts. This may allow a customer 1104 to visually identify the errors and/or conflicts and utilize the graphical composer to perform any remedial actions to eliminate these errors and/or conflicts.

Once a customer 1104 has created a graphical representation of one or more policies that include no errors or conflicts, the policy management service 1120 may serialize the permission model to a structured format (e.g., JSON, XML, SecPol, Amazon Web Services Access Policy Language etc.) to create the one or more policies. Accordingly, the policy management service 1120 may transmit the created policies to the applicable services provided by the computing resource service provider 1102 to enforce the policies and establish a level of access to resources within these services for one or more users.

The computing resource service provider 1102 may additionally maintain one or more other services 1122 based at least in part on the needs of its customers 1104. For instance, the computing resource service provider 1102 may maintain a Domain Name System (DNS) service for its customers 1104. A DNS service may be designed to give customers 1104 a method to route end users to one or more communications network applications. For instance, the DNS service may be configured to translate human-readable names, such as uniform resource locators (URLs), into numeric Internet Protocol (IP) addresses that computer systems may use to connect to each other over the Internet. Thus, the DNS service may be configured to connect requests to access one or more services provided by the computing resource service provider 1102 to infrastructure that is operating within a particular data zone. The DNS service may additionally be configured to route customers 1104 of the computing resource service provider 1102 to infrastructure outside of a particular data zone, such as another computing system operated by a separate provider. Other services include, but are not limited to, authentication services and services that manage other services and/or other services.

Figure 12:
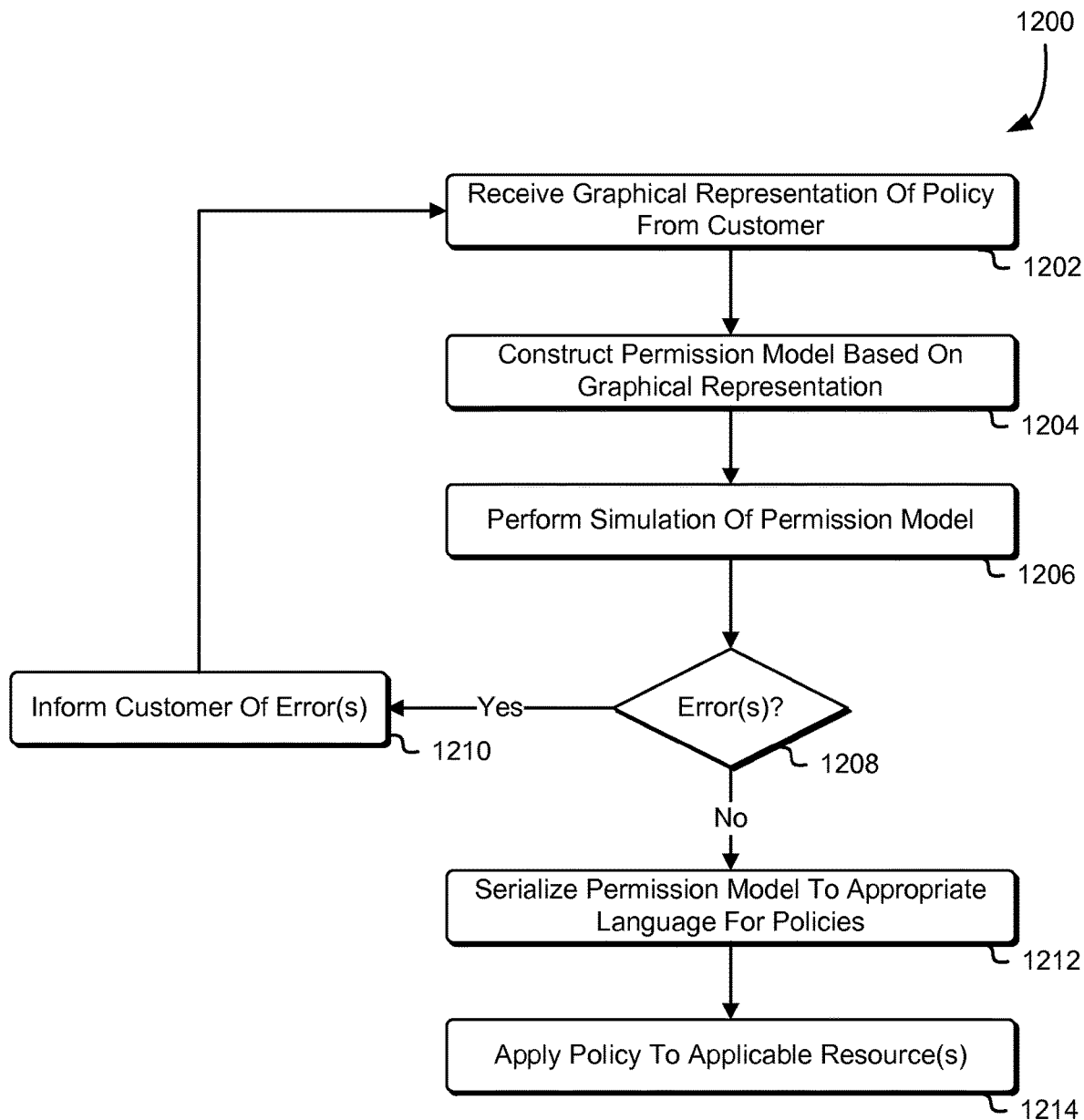
FIG. 12 shows an illustrative example of a process for utilizing a graphical composer to create and apply one or more policies in accordance with at least one embodiment.

As noted above, a customer of a computing resource service provider may access a graphical composer through a policy management service to create a graphical representation of one or more policies which, in turn, may be serialized into one or more enforceable policies. Accordingly, FIG. 12 shows an illustrative example of a process 1200 for utilizing a graphical composer to create and apply one or more policies in accordance with at least one embodiment. The process 1200 may be performed by a policy management service, provided by a computing resource service provider to its customers, configured to provide a graphical composer for creating a graphical representation of one or more policies. Additionally, the policy management service may be configured to evaluate these graphical representations of policies to ensure that no conflicts or errors exist prior to serialization of the policy.

The policy management service may enable customers of the computing resource service provider to utilize a graphical composer to generate one or more enforceable policies, which may be used to define a level of access to one or more resources. For instance, as illustrated in FIGS. 2 and 3, a customer may utilize one or more iconic representations of resources and actions and one or more connectors to create a graphical representation of a policy. When a customer uses a connector to connect a resource to at least one action, the graphical composer may transmit one or more executable instructions to a policy management sub-system of the policy management service to begin analysis of this graphical representation of the policy. Accordingly, the policy management service may receive 1202 a graphical representation of a policy from a customer through the graphical composer.

Once the policy management sub-system has received the graphical representation of the policy, the policy management sub-system may utilize this graphical representation to construct 1204 a permission model that is based at least in part on the graphical representation of the policy. For instance, the policy management sub-system may be configured to convert the graphical representation of the policy into a structured, textual format (e.g., JSON, XML, SecPol, Amazon Web Services Access Policy Language etc.), which the policy management sub-system may use to perform 1206 one or more simulations of the permission model to identify any errors and/or conflicts that may be inherent in the permission model.

To perform the one or more simulations, the policy management sub-system may apply the permission model to one or more dummy user profiles and simulate attempts by the dummy user to access one or more applicable resources. If the dummy user is able to circumvent the permission model to perform one or more impermissible actions on a target resource, then the policy management sub-system may be able to determine that an error exists within the permission model. Additionally, the policy management sub-system may be unable to utilize the permission model due to one or more conflicts that may be inherent within the model. For instance, if a customer has generated a graphical representation of a policy that includes both a permission to perform write actions on a particular resource and a denial of permission to perform said write actions on the same resource, the policy may be unenforceable as a conflict may exist. Accordingly, the policy management sub-system may determine 1208 whether the simulation of the created permission model has resulted in detection of one or more errors and/or conflicts.

If the policy management sub-system detects, through simulation of the permission model, that the graphical representation of the policy includes one or more errors and/or conflicts, the policy management sub-system may cause the graphical composer to inform 1210 the customer of the errors and/or conflicts. For instance, the graphical composer may be configured to highlight the relevant portions of the graphical representation of the policy to demonstrate where the errors and/or conflicts may be located. For example, as illustrated in FIG. 3, the graphical composer may utilize one or more textual statements, such as the bold "ERROR" statement, to indicate that a particular permission for an action is the source of an error. Further, if the graphical composer includes a policy textual representation window that includes a textual representation of the policy, the graphical composer may also highlight the relevant portion of the textual representation that is the source of the errors and/or conflicts. Thus, a customer may be able to visualize where the errors and/or conflicts are located and perform one or more remedial actions to address these issues.

If the policy management sub-system, however, is unable to identify any errors and/or conflicts through simulation of the permission model, the policy management sub-system may, upon customer approval provided through the graphical composer, serialize 1212 the permission model into a particular structured textual format used to generate policies and readable by one or more services provided by the computing resource service provider. For instance, the policy management sub-system may convert the permission model into a suitable structured format, such as JSON, XML, SecPol, Amazon Web Services Access Policy Language and the like. Once the policy has been created, the policy management sub-system may apply 1214 the newly created policy to the applicable resources, user profiles and services. Thus, when a user attempts to perform one or more actions on a particular resource, the service where the resource may be located may access the policy management service and identify the relevant policy to determine whether the user is permitted to perform such actions.

Figure 13:
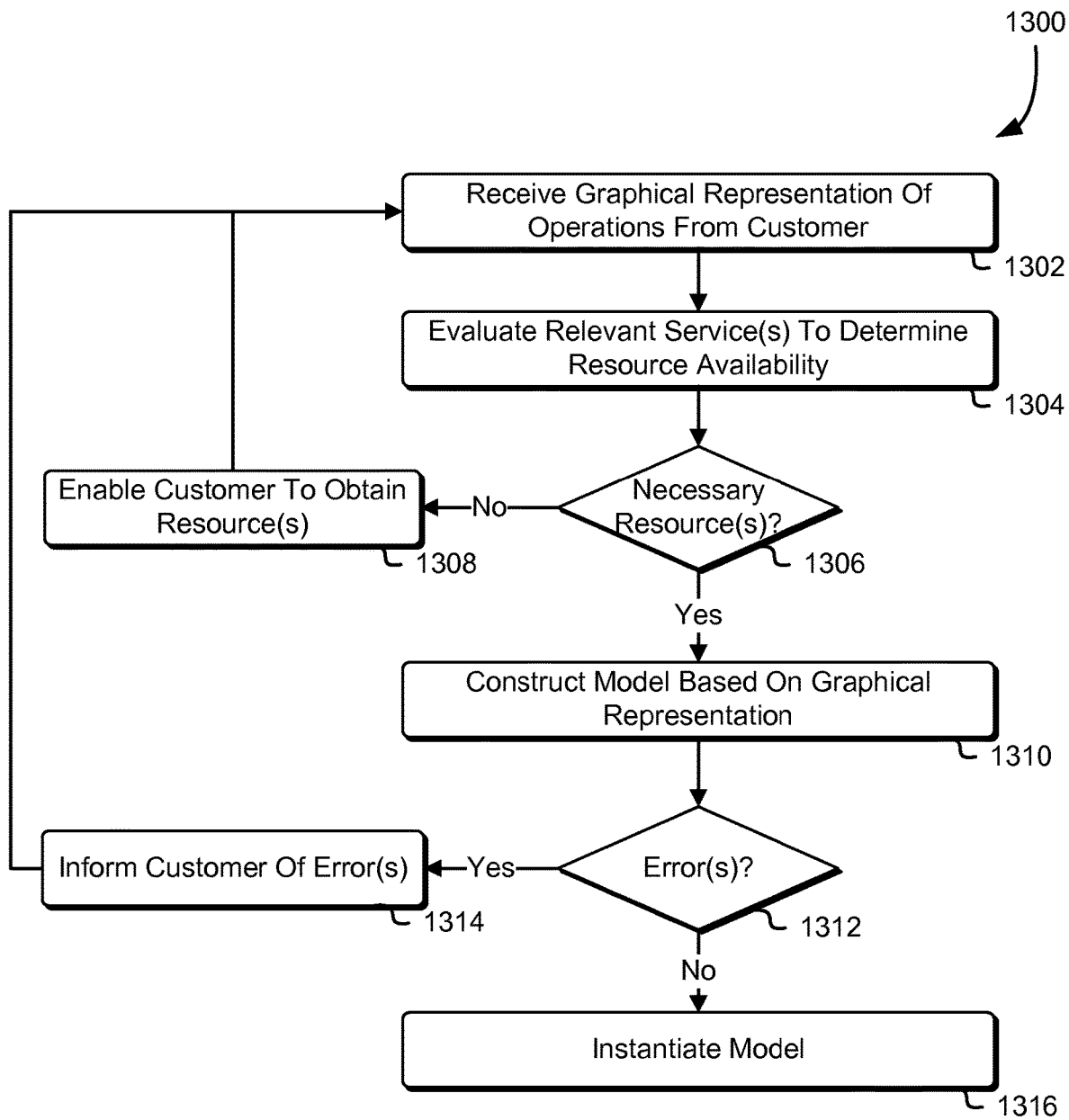
FIG. 13 shows an illustrative example of a process for utilizing a graphical composer to create an application and integrating one or more resources in accordance with at least one embodiment.

As noted above, the computing resource service provider may further provide customers with an interface, which the customers may use to access a graphical composer for generating one or more applications to support his or her business needs. Accordingly, FIG. 13 shows an illustrative example of a process 1300 for utilizing one or more graphical composers to create an application and integrating one or more resources and services in accordance with at least one embodiment. The process 1300 may be performed by a resource management sub-system, maintained by the computing resource service provider and configured to utilize a graphical representation of one or more operations of an application to test a model of the application and isolate any errors and/or conflicts that may exist. Additionally, the resource management sub-system may be configured to instantiate the model of the application into an executable programming language, which may be used by one or more computing systems to utilize the application and cause the computing systems to interact with the one or more applicable resources and services.

The computing resource service provider may enable customers to utilize one or more graphical composers to generate one or more applications, which may be provided to one or more users to support his or her business needs. For instance, as illustrated in FIGS. 7 and 8, a customer may utilize one or more iconic representations of resources, actions and one or more connectors to create a graphical representation of one or more operations that may performed by the application. Additionally, as illustrated in FIG. 9, a customer may utilize one or more iconic representations of device elements, devices where the application may be installed and one or more connectors to create a graphical representation of the application layout and the interactions that may be performed between the devices and the application itself. When a customer utilizes the graphical composers to graphically define one or more operations, the application layout and the interactions between the application and the one or more devices, the graphical composer may transmit one or more executable instructions to a resource management sub-system of the computing resource service provider to begin analysis of these graphical representations of the one or more operations that are to be incorporated into the application, the application layout and the interactions that may be performed between the application and the one or more devices. Accordingly, the resource management sub-system may receive 1302 a graphical representation of one or more operations from a customer through the graphical composer.

Once the resource management sub-system has received the one or more graphical representations of the one or more operations that are to be incorporated into the application, the application layout and the interactions that may be performed between the application and the one or more devices, the resource management sub-system may evaluate 1304 the relevant services where the resources included within the one or more graphical representations to determine the availability of these resources. For instance, the resource management sub-system may access any relevant services to determine 1306 if the customer has provisioned the requisite resources necessary to support the one or more operations. If the customer has not provisioned the requisite resources necessary to perform the one or more specified operations, the resource management sub-system may cause at least one of the one or more graphical composers to enable 1308 the customer or resource to obtain the resources necessary for the performance of the specified operations.

In an embodiment, at least one of the one or more graphical composers may be configured to display a graphical user interface that includes information regarding any resources that may need to be provisioned, as well as one or more options for provisioning these resources. For example, the graphical user interface may include pricing information for necessary resources and one or more buttons, which a customer may utilize to approve provisioning of these resources to support the one or more operations graphically represented within the graphical composer. If the customer requests provisioning of one or more resources, the graphical composer may transmit one or more API calls to one or more services to provision these resources.

As noted above, the resource management sub-system, upon determining that the customer has not provisioned one or more resources included in the graphical representation of the one or more operations, may provision the necessary one or more resources on behalf of the customer automatically. Accordingly, the resource management sub-system may not be required to enable 1308 the customer to obtain the necessary one or more resources, as these one or more resources may be provisioned without customer input. Alternatively, the resource management sub-system, in an embodiment, will not determine 1306 whether the customer has provisioned the requisite resources necessary to perform the one or more specified operations. In this case, the resource management sub-system may be configured to provision these necessary one or more resources without evaluating what resources the customer may have provisioned at a previous time. Thus, once the resource management sub-system has evaluated the relevant services to determine what resources are required, the resource management sub-system may provision these resources and construct 1310 the application model.

If the resource management sub-system is able to determine that the necessary resources are available to support the one or more operations, the resource management sub-system may construct 1310 an application model based at least in part on the graphical representation of the one or more operations, the application layout and the interactions that may be performed between the application and the one or more devices. The application model may be constructed using a domain specific language such as HTML, Logo, Verilog, MATLAB language, GNU Octave and the like. Accordingly, the resource management sub-system may perform one or more simulations using the application model to determine 1312 whether the application may generate one or more errors and/or conflicts while in use.

If the resource management sub-system detects, through simulation of the application model, that at least one of the graphical representations of the one or more operations, the application layout and the interactions that may be performed between the application and the one or more devices includes one or more errors, the resource management sub-system may transmit one or more notifications to at least one of the one or more graphical composers to cause the graphical composer to inform 1314 the customer of the errors. For instance, the graphical composer may be configured to highlight the relevant portions of the graphical representation of the one or more operations to demonstrate where the errors may be located. Thus, a customer may be able to visualize where the errors are located and perform one or more remedial actions to address these issues.

If, however, the simulation of the application model does not produce any errors or other issues, the resource management sub-system may instantiate 1316 the DSL model into an executable programming language that may be used to execute the one or more operations within the one or more relevant services. Further, the application model may be compiled into an executable programming language that is understandable by one or more operating systems, as specified by the customer, to enable users to install the application on their devices and utilize the application to access and/or interact with one or more resources. For instance, if the customer has specified that the application is to be available to computer systems that utilize iOS®, Windows® or UNIX® operating systems, the resource management sub-system may compile the application model into one or more executable programming languages that may be used by these operating systems. This may enable the application to be compatible with these operating systems and reach a wider audience.

Once the application model has been instantiated (e.g., compiled into an executable programming language and made available to other users such that the application may be installed on their computing devices), the resource management sub-system may transmit one or more commands to the relevant services to enable these services to perform the one or more operations that have been integrated into the application. Thus, when a user utilizes the application, the one or more relevant services may already be configured to communicate with the other relevant services to obtain any necessary resources and perform the one or more operations integrated into the application.

Figure 14:
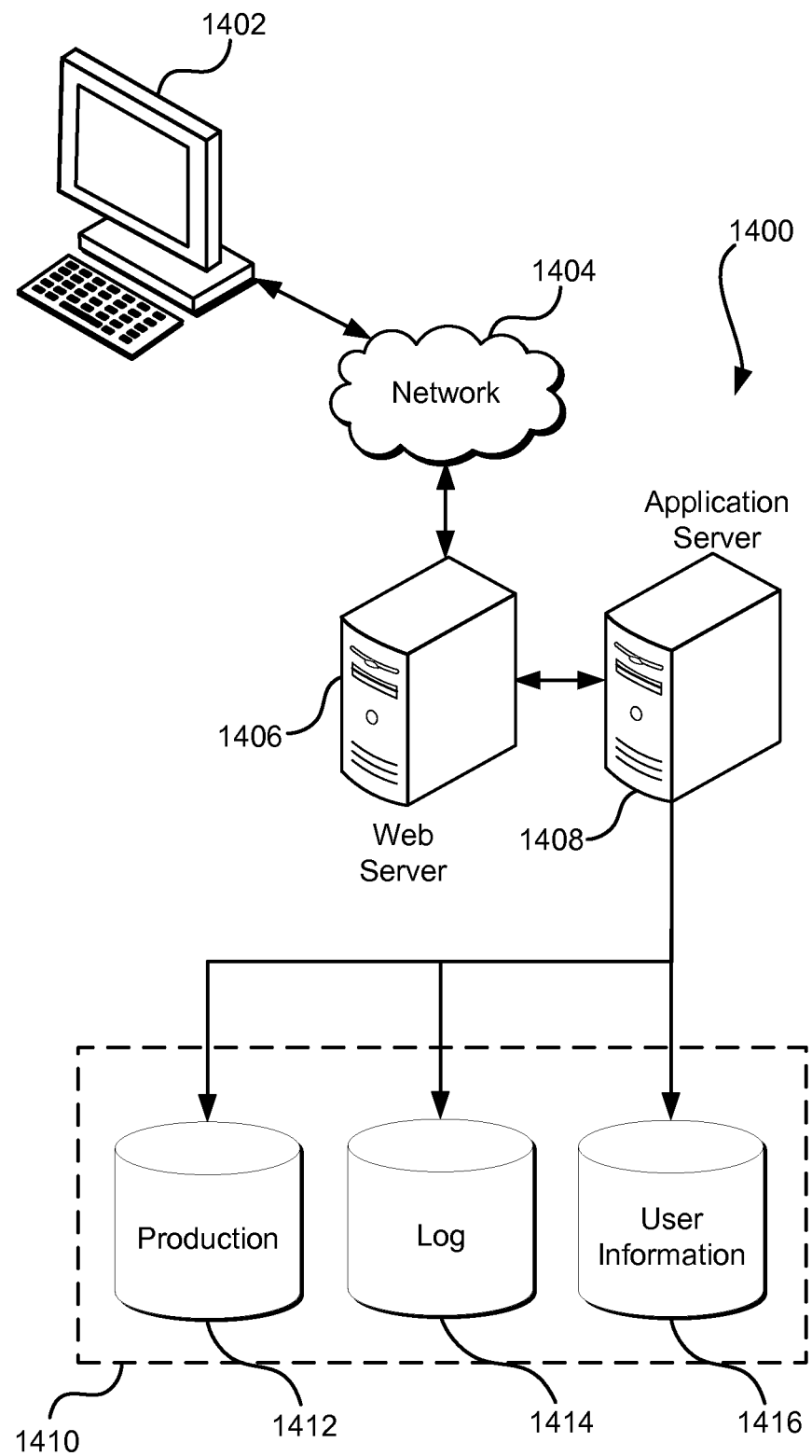
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:

Receiving, through a graphical user interface, information generated based at least in part on a graphical representation of a policy applicable to a user, the graphical representation of the policy applicable to the user displayed in the graphical user interface and comprising at least:
  an iconic representation of a computing resource;
  an iconic representation of a first action performable on the computing resource;
  an iconic representation of a second action performable on the computing resource;
  a first connector connecting the iconic representation of the computing resource to the iconic representation of the first action, the first connector being of an allow connector representing to a user associated permission to allow performance of the first action on the computing resource, and the first connector corresponding to a first textual portion usable to generate a permission model; and
  a second connector connecting the iconic representation of the computing resource to the iconic representation of the second action, the second connector being of a deny connector representing a user associated permission to deny performance of the second action on the computing resource, and the second connector corresponding to a second textual portion usable to generate the permission model, wherein a line representing the first connector is displayed in the graphical user interface with different visual characteristics than a line representing the second connector displayed in the graphical user interface;

generating, based at least in part on the received information, the permission model representing the policy and usable to simulate the graphical representation of the policy, the permission model generated by converting the graphical representation of the policy into a textual representation of the policy in a policy language, the textual representation of the policy comprising at least the first and second textual portions;

displaying, through the graphical user interface, the textual representation of the policy in the policy language;

performing one or more simulations based at least in part on the permission model to determine whether to validate the permission model; and as a result of the permission model not being validated as a result of a conflict between the allow connector and the deny connector, modifying the graphical representation of the policy in the graphical user interface and the textual representation of the policy in the graphical user interface such that both the graphical representation of the policy and the textual representation of the policy indicate an error.

2. The computer-implemented method of claim 1, further comprising:
  enabling, as a result of the permission model not being validated, further modification of the graphical representation of the policy such that the permission model can be validated.

3. The computer-implemented method of claim 1, further comprising storing the textual representation of the policy in a policy data store such that the textual representation of the policy can be accessed and used to create the graphical representation of the policy to enable modification of the policy.

4. A computer system, comprising:
  one or more processors; and
  memory including instructions that, as a result of being executed by the one or more processors, cause the computer system to:
  receive data generated based at least in part on a graphical representation of a policy applicable to a user, the graphical representation of the policy applicable to the user displayed in a graphical user interface and comprising at least:
    an iconic representation of a computing resource;
    an iconic representation of a first action performable on the computing resource;
    a first connector connecting the iconic representation of the computing resource to the iconic representation of the first action, the first connector displayed in the graphical user interface and being of an allow connector representing a parameter corresponding to a permission to allow performance of the first action on the computing resource; and
    a second connector connecting the iconic representation of the computing resource to the iconic representation of a second action, the second connector displayed in the graphical user interface and being of a deny connector representing a permission to deny performance of the second action on the computing resource, the second connector displayed in the graphical user interface with visual characteristics different than visual characteristics of the first connector displayed in the graphical user interface;

generate, based at least in part on the data, a model comprising a non-graphical representation of the policy usable to validate the model, the model generated by converting the graphical representation of the policy into a textual representation of the policy in a policy language;

display, through the graphical user interface, the textual representation of the policy in the policy language; and determine whether to validate the model based at least in part on one or more simulations associated with the model such that:

if the model is validated, create a policy based at least in part on the model; and if the model cannot be validated as a result of a conflict between the allow connector and the deny connector, modify the graphical representation of the policy and the textual representation of the policy such that both the graphical representation of the policy and the textual representation of the policy indicate an error.

5. The computer system of claim 4, wherein the computer system is further configured to provide for display the graphical user interface that enables a user to provide user input to compose the graphical representation of the policy.

6. The computer system of claim 4, wherein creating the policy based at least in part on the model includes serializing the model.

7. The computer system of claim 4, wherein the data generated based at least in part on the graphical representation of the policy defines at least a first relationship between the computing resource and the first action performable on the computing resource and a second relationship between the computing resource and the second action performable on the computing resource.

8. The computer system of claim 4, wherein the computer system is further configured to store the textual representation of the policy in a policy data store such that the policy can be accessed and used to create the graphical representation of the policy to enable creation of new policies.

9. The computer system of claim 4, wherein the computer system is further configured to enable creation of a template usable to generate the graphical representation of the policy, the template comprising at least the iconic representation of a computing resource, the iconic representation of the first action performable on the computing resource, the iconic representation of the second action performable on the computing resource, the first connector, and the second connector.

10. A non-transitory computer-readable storage medium storing thereon executable instructions that, as a result of being executed by one or more processors of a computer system, cause the computer system to at least: generate, by converting a graphical representation of a policy displayed in a graphical user interface into a textual representation of the policy, a model usable to validate the graphical representation of the policy, the graphical representation of the policy displayed in the graphical user interface comprising at least:

an iconic representation of a computing resource;
an iconic representation of a first action performable on the computing resource;
an iconic representation of a second action performable on the computing resource;
a first connector connecting the iconic representation of the computing resource to the iconic representation of the first action, the first connector displayed in the graphical user interface and being of an allow connector representing a parameter corresponding to a permission to allow performance of the first action on the computing resource; and
a second connector connecting the iconic representation of the computing resource to the iconic representation of the second action, the second connector displayed in the graphical user interface and being of a deny connector representing a permission to deny performance of the second action on the computing resource, the second connector displayed in the graphical user interface with visual characteristics different than visual characteristics of the first connector displayed in the graphical user interface;

cause the textual representation of the policy in a policy language to be displayed through the graphical user interface of the computer system; and perform one or more simulations based on the model to validate the model such that:

if the model cannot be validated as a result of a conflict between the allow connector and the deny connector, modify the graphical representation of the policy and the textual representation of the policy such that both the graphical representation of the policy and the textual representation of the policy indicate an error; and if the model is validated, utilize the model to create a policy.

11. The non-transitory computer-readable storage medium of claim 10, wherein the graphical representation of the policy is generated using a graphical composer including at least the iconic representation of the computing resource, the iconic representation of the first action, the iconic representation of the second action, the first connector for defining a first relationship between the computing resource and the first action performable on the computing resource, and the second connector for defining a second relationship between the computing resource and the second action performable on the computing resource.

12. The non-transitory computer-readable storage medium of claim 10, wherein utilizing the model to create the policy includes serializing the model.

13. The non-transitory computer-readable storage medium of claim 10, wherein the instructions further comprise instructions that, as a result of being executed by the one or more processors, cause the computer system to store the policy in a policy data store such that the policy can be accessed and used to create the graphical representation of the policy to enable modification of the policy.

14. The non-transitory computer-readable storage medium of claim 10, wherein the instructions further comprise instructions that, as a result of being executed by the one or more processors, cause the computer system to provide the policy to the computing resource in accordance with the policy.

15. The non-transitory computer-readable storage medium of claim 10, wherein the instructions further comprise instructions that, as a result of being executed by the one or more processors, cause the computer system to provide for display the graphical user interface that enables a user to provide user input to compose the graphical representation of the policy.

16. The non-transitory computer-readable storage medium of claim 10, wherein the graphical representation of the policy defines at least a first relationship between the computing resource and the first action performable on the computing resource and a second relationship between the computing resource and the second action performable on the computing resource.

17. The non-transitory computer-readable storage medium of claim 10, wherein the instructions further comprise instructions that, as a result of being executed by the one or more processors, cause the computer system to enable creation of a template usable to generate the graphical representation of the policy, the template comprising at least the iconic representation of the computing resource, the iconic representation of the first action performable on the computing resource, the iconic representation of the second action performable on the computing resource, the first connector and the second connector.

18. The computer system of claim 4, wherein the policy language is a structured format that is readable by the computing resource to implement the policy.

19. The computer-implemented method of claim 1, further comprising:
   receiving, through the graphical user interface, second information generated based at least in part on a graphical representation of a second policy;
   generating, based at least in part on the received second information, a second permission model representing the second policy and usable to simulate the graphical representation of the second policy, the second permission model generated by converting the graphical representation of the second policy into a textual representation of the second policy in a policy language;
   displaying, through the graphical user interface, the textual representation of the second policy in the policy language;
   performing one or more additional simulations based at least in part on the second permission model to determine whether to validate the second permission model;
   as a result of the second permission model being validated, serializing the second permission model; and
   providing the textual representation of the second policy for use in controlling access to the computing resource in accordance with the second policy.

20. The non-transitory computer-readable storage medium of claim 10, wherein the instructions further comprise instructions that, as a result of being executed by the one or more processors, cause the computer system to enable, as a result of the model not being validated, further modification of the graphical representation of the policy such that the model can be validated.

21. The computer-implemented method of claim 1, wherein the method further comprises storing the textual representation of the policy in a data store such that the policy can be accessed to create the graphical representation of the policy to enable creation of new policies.

* * * * *